United States Patent
Sugimoto et al.

(10) Patent No.: US 10,215,225 B2
(45) Date of Patent: Feb. 26, 2019

(54) POWER-TRANSMITTING MECHANISM WITH ROLLING-ELEMENT BEARING

(71) Applicants: KANZAKI KOKYUKOKI MFG. CO., LTD., Amagasaki-shi (JP); KINKI UNIVERSITY, Higashiosaka-shi (JP)

(72) Inventors: Hiroshi Sugimoto, Amagasaki (JP); Hajimu Imanaka, Amagasaki (JP); Hiroshi Tottori, Amagasaki (JP); Yasuyoshi Tozaki, Higashiosaka (JP)

(73) Assignees: KANZAKI KOKYUKOKI MFG. CO., LTD., Amagasaki-shi, Hyogo (JP); KINKI UNIVERSITY, Higashiosaka-shi, Osaka (JP)

( * ) Notice: Subject to any disclaimer, the term of this patent is extended or adjusted under 35 U.S.C. 154(b) by 0 days.

(21) Appl. No.: 15/469,027

(22) Filed: Mar. 24, 2017

(65) Prior Publication Data
US 2017/0284459 A1 Oct. 5, 2017

(30) Foreign Application Priority Data
Mar. 30, 2016 (JP) .................................. 2016-069167

(51) Int. Cl.
*F16H 3/06* (2006.01)
*F16C 19/18* (2006.01)
(Continued)

(52) U.S. Cl.
CPC .......... *F16C 19/183* (2013.01); *F16C 19/184* (2013.01); *F16C 25/06* (2013.01);
(Continued)

(58) Field of Classification Search
None
See application file for complete search history.

(56) References Cited

U.S. PATENT DOCUMENTS 1,585,140 A * 5/1926 Erban ................... F16H 15/503
192/44
1,737,997 A * 12/1929 Garrard .................. F16H 13/06
475/183
(Continued)

FOREIGN PATENT DOCUMENTS

DE  DE-202012011274 U1 * 2/2014 ............. F03D 80/70
JP  JP-58191362 A * 11/1983 ............. F16H 13/08
(Continued)

*Primary Examiner* — Dirk Wright
(74) *Attorney, Agent, or Firm* — Sterne, Kessler, Goldstein & Fox P.L.L.C.

(57) ABSTRACT

In a power-transmitting mechanism with rolling-element bearing according to the present invention, an inner ring has plural inner ring members disposed in series in an axial direction, an outer ring has plural outer ring members respectively cooperating with the plural inner ring members. Plural rolling elements are disposed between the cooperating inner ring members and outer ring members. A retainer has plural partitions retaining the plural rolling elements at predetermined intervals in the circumferential direction such that rolling elements disposed between one pair of cooperating inner ring and outer ring members and rolling elements disposed between another pair of cooperating inner ring and outer ring members orbit the corresponding inner ring members in a synchronized manner, and a connector connecting the plural partitions such that the plural partitions integrally rotate around an axis.

20 Claims, 10 Drawing Sheets

(51) Int. Cl.
*F16C 25/06* (2006.01)
*F16C 33/49* (2006.01)
*F16C 33/60* (2006.01)
*F16H 61/40* (2010.01)

(52) U.S. Cl.
CPC ............ *F16C 33/495* (2013.01); *F16C 33/60* (2013.01); *F16H 61/40* (2013.01); *F16C 33/497* (2013.01); *F16C 2229/00* (2013.01); *F16C 2240/14* (2013.01); *F16C 2361/41* (2013.01)

(56) References Cited

U.S. PATENT DOCUMENTS

| | | | | | |
|---|---|---|---|---|---|
| RE18,175 | E | * | 9/1931 | Erban | F16H 13/14 475/183 |
| 2,704,157 | A | * | 3/1955 | Hertrich | B04B 9/10 192/103 R |
| 2,938,409 | A | * | 5/1960 | Bucalo | F16H 13/08 475/196 |
| 2,972,841 | A | * | 2/1961 | Anderson | B24B 7/16 451/52 |
| 3,008,061 | A | * | 11/1961 | Mims | F16H 13/08 310/83 |
| 3,011,364 | A | * | 12/1961 | Mims | F16C 19/55 384/461 |
| 3,084,570 | A | * | 4/1963 | Holder | B23Q 5/048 475/196 |
| 3,477,315 | A | * | 11/1969 | Macks | F16H 13/08 310/83 |
| 4,227,755 | A | * | 10/1980 | Lundberg | F01C 21/02 384/101 |
| 5,067,827 | A | * | 11/1991 | Bokel | F16C 25/083 384/510 |
| 5,316,393 | A | * | 5/1994 | Daugherty | F16C 25/083 384/517 |
| 6,048,101 | A | * | 4/2000 | Rasmussen | F01C 21/02 384/517 |
| 8,672,792 | B2 | * | 3/2014 | Tozaki | F16H 13/08 475/183 |
| 2015/0211572 | A1 | * | 7/2015 | Casazza | F03D 7/00 290/44 |
| 2016/0201685 | A1 | * | 7/2016 | Becker | F04D 29/049 384/517 |

FOREIGN PATENT DOCUMENTS

| | | | | |
|---|---|---|---|---|
| JP | 2003-278866 A | | 10/2003 | |
| JP | JP-2008057657 A | * | 3/2008 | ............ F16C 35/077 |
| JP | 2014-152800 A | | 8/2014 | |

* cited by examiner

POWER-TRANSMITTING MECHANISM WITH ROLLING-ELEMENT BEARING

BACKGROUND OF THE INVENTION

Field of the Invention

The present invention relates to a power-transmitting mechanism with rolling-element bearing.

Related Art

JP2014-152800A (hereinafter referred to as Patent Document 1) proposes a power-transmitting mechanism with rolling-element bearing, comprising an inner ring supported by a rotational shaft so as to be incapable of relative rotation and movable in the axial direction; an outer ring that surrounds the inner ring such that there is a gap between the inner circumferential surface of the outer ring and the outer circumferential surface of the inner ring, and is incapable of rotation and is movable in the axial direction; a plurality of rolling elements held by the inner ring and the outer ring therebetween; a retainer that is disposed coaxially with the rotational shaft and retains the plurality of rolling elements at predetermined intervals in the circumferential direction; and a preloading means exerting a pressing force in the axial direction on one of the inner ring and the outer ring to exert a preload necessary for power transmission between the inner ring and the outer ring via the plurality of rolling elements.

Since the rotational shaft that acts as one of the input shaft and the output shaft and the retainer that acts as the other one of the input shaft and the output shaft can be coaxially positioned, the power-transmitting mechanism with rolling-element bearing described in Patent Document 1 is more useful than speed-changing power-transmitting mechanisms of a gear type in that rotary power can be transmitted in various speeds between the rotational shaft and the retainer without involving an increased size.

Moreover, the above power-transmitting mechanism with rolling-element bearing is also useful in that power loss resulting from the friction of gear tooth surfaces and noise due to gear meshing can be prevented.

However, the power-transmitting mechanism with rolling-element bearing described in Patent Document 1 has room for improvement from the viewpoint of high-load capability.

On the other hand, JP2003-278866A (hereinafter referred to as Patent Document 2) discloses a hybrid power-transmitting structure configured such that the rotary power of an input shaft is transmitted via a gear train to an intermediate shaft disposed parallel to the input shaft, and the rotary power of the intermediate shaft is transmitted via a power-transmitting mechanism with rolling-element bearing to an output shaft disposed coaxially with the intermediate shaft.

In the power-transmitting structure described in Patent Document 2, a gear reaction force produced in the gear train is utilized as a preload on the power-transmitting mechanism with rolling-element bearing to thereby prevent rolling elements provided between an inner ring and an outer ring from slipping on the inner ring and the outer ring, and the power-transmitting structure described in Patent Document 2 is thus useful in that the preload can be increased.

However, there is a problem in that the above power-transmitting structure has an increased size in the radial direction due to the gear train, and, moreover, although the preload can be increased, there is room for improvement from the viewpoint of the high-load capabilities of the inner ring, the rolling elements, and the outer ring.

SUMMARY OF THE INVENTION

The present invention has been conceived in view of the conventional art described above, and an object of the present invention is to provide a power-transmitting mechanism with rolling-element bearing, which is capable of increasing the torque of rotary power that can be transmitted in various speeds without involving an increased size.

In order to achieve the object, the present invention provides a power-transmitting mechanism with rolling-element bearing, including an inner ring directly or indirectly supported by a rotational shaft so as to be incapable of relative rotation, an outer ring surrounding the inner ring such that there is a gap between the outer ring and the inner ring, a plurality of rolling elements held by the inner ring and the outer ring therebetween, a retainer that retains the plurality of rolling elements at predetermined intervals in a circumferential direction and rotates around the same axis as the rotational shaft in conjunction with orbital rotation of the plurality of rolling elements, and a preloading means exerting a pressing force in an axial direction on one of the inner ring and the outer ring to exert a preload between the inner ring and the outer ring, wherein the inner ring has a plurality of inner ring members disposed in series in the axial direction; the outer ring has a plurality of outer ring members respectively cooperating with the plurality of inner ring members; the plurality of rolling elements are disposed between the cooperating inner ring members and outer ring members; and the retainer has a plurality of partitions retaining the plurality of rolling elements at predetermined intervals in the circumferential direction such that rolling elements disposed between one pair of cooperating inner ring and outer ring members and rolling elements disposed between another pair of cooperating inner ring and outer ring members orbit the corresponding inner ring members in a synchronized manner, and a connector connecting the plurality of partitions such that the plurality of partitions integrally rotate around an axis.

A power-transmitting mechanism with rolling-element makes it possible to increase the torque of rotary power that can be transmitted in various speeds without involving an increased size, since the inner ring has the plurality of inner ring members disposed in series in the axial direction, the outer ring has the plurality of outer ring members respectively cooperating with the plurality of inner ring members, the plurality of rolling elements are disposed between the cooperating inner ring members and outer ring members, and the retainer has the plurality of partitions retaining the plurality of rolling elements at predetermined intervals in the circumferential direction such that rolling elements disposed between one pair of cooperating inner ring and outer ring members and rolling elements disposed between another pair of cooperating inner ring and outer ring members orbit the corresponding inner ring members in a synchronized manner, and the connector connecting the plurality of partitions such that the plurality of partitions integrally rotate around an axis.

Preferably, the one pair of cooperating inner and outer ring members and the rolling elements disposed therebetween have the same configurations as the other pair of cooperating inner and outer ring members and the rolling elements disposed therebetween.

The power-transmitting mechanism with rolling-element according to the present invention preferably may further include a power-transmitting case accommodating the plurality of inner ring members, the plurality of rolling elements, the plurality of outer ring members, and the retainer, so as to allow access to the plurality of inner ring members and the retainer from outside.

In a first aspect of a double-stage structure according to the present invention where the inner ring has first and second inner ring members disposed in series in order of a first side, which is one side in the axial direction, to a second side, which is opposite to the first side in the axial direction, as the plurality of inner ring members, and the outer ring has first and second outer ring members respectively cooperating with the first and second inner ring members as the plurality of outer ring members, the power-transmitting case has a stopper engaged with an end face on the first side in the axial direction of the first outer ring member to prevent movement of the first outer ring member toward the first side in the axial direction and the preloading means presses the second outer ring toward the first side in the axial direction.

In this case, the second outer ring member, the second inner ring member, the first inner ring member and the first outer ring member are configured such that a pressing force exerted on the second outer ring member by the preloading means is transmitted to the second inner ring member via the corresponding rolling elements as a force that presses the second inner ring member toward the first side in the axial direction, and the pressing force toward the first side in the axial direction transmitted to the second inner ring member is transmitted to the first outer ring member via the first inner ring member and the corresponding rolling elements as a force that presses the first outer ring member toward the first side in the axial direction.

In a first embodiment of the first aspect, the power-transmitting case has a peripheral wall, a first end wall blocking the first side in the axial direction of the peripheral wall and having an axial hole into which the rotational shaft is inserted, and a second end wall blocking the second side in the axial direction of the peripheral wall and having an access opening for access to the retainer. The peripheral wall has an engagement surface directly or indirectly engaged with outer circumferential surfaces of the first and second outer ring members so as to allow axial-direction movement of at least the second outer ring member, and terminating at a position more toward the first side in the axial direction than the second end wall is, and an attachment surface extending from an end on the second side in the axial direction of the engagement surface in a radially outward direction with reference to an axis of the rotational shaft, and facing the second side in the axial direction. The preloading means has a screw member inserted into a screw hole open to the attachment surface, and a pressing body directly or indirectly engaged with the second side in the axial direction of the second outer ring member and fixed to the peripheral wall by the screw member.

In a second embodiment of the first aspect, the power-transmitting case has a peripheral wall, a first end wall blocking the first side in the axial direction of the peripheral wall and having an axial hole into which the rotational shaft is inserted, and a second end wall removably attached to the peripheral wall so as to block an opening on the second side in the axial direction of the peripheral wall, wherein the opening enables the first and second outer ring members to be inserted, and the second end wall has an access opening for access to the retainer. The peripheral wall has an engagement surface directly or indirectly engaged with outer circumferential surfaces of the first and second outer ring members so as to allow axial-direction movement of at least the second outer ring member, and terminating at a position more toward the first side in the axial direction than the opening on the second side in the axial direction of the peripheral wall is.

In this case, the second end wall is removably connected to the peripheral wall such that an outer circumferential surface of the second end wall is engaged with an inner circumferential surface of the peripheral wall on more toward the second side in the axial direction than the engagement surface is, and the preloading means has a pressing body that is provided in the second end wall so as to be directly or indirectly engaged with the second side in the axial direction of the second outer ring member.

In a third embodiment of the first aspect, the power-transmitting case has a peripheral wall, a first end wall blocking the first side in the axial direction of the peripheral wall and having an axial hole into which the rotational shaft is inserted, and a second end wall blocking the second side in the axial direction of the peripheral wall and having an access opening for access to the retainer. The peripheral wall has an engagement surface directly or indirectly engaged with outer circumferential surfaces of the first and second outer ring members so as to allow axial-direction movement of at least the second outer ring member. The preloading means has a pressing body penetrating the second end wall such that the distal end is directly or indirectly engaged with the second side in the axial direction of the second outer ring member, and the fixed position of the pressing body in the axial direction is adjustable.

In a second aspect of a double-stage structure according to the present invention where the inner ring has first and second inner ring members, and the outer ring has first and second outer ring members, the rotational shaft is provided with a first stopper directly or indirectly engaged with the end face on the first side in the axial direction of the first inner ring member to prevent the movement of the first inner ring member toward the first side in the axial direction, and a second stopper directly or indirectly engaged with the end face on the second side in the axial direction of the second inner ring member to prevent the movement of the second inner ring member toward the second side in the axial direction. The power-transmitting case has a peripheral wall having an engagement surface directly or indirectly engaged with the outer circumferential surfaces of the first and second outer ring members so as to allow axial-direction movement of the first and second outer ring members, a first end wall blocking the first side in the axial direction of the peripheral wall and having an axial hole into which the pump shaft is inserted, and a second end wall blocking the second side in the axial direction of the peripheral wall and having an access opening for access to the retainer.

In the second aspect, the preloading means has at least two pressing bodies provided to penetrate the peripheral wall such that the distal ends face a position between the first and second outer ring members, and the fixed positions of the pressing bodies in the radial direction in reference to the axis of the rotational shaft are adjustable. The distal ends of the pressing bodies, and/or the second side in the axial direction of the first outer ring member and the first side in the axial direction of the second outer ring member, have a cam surface that presses the first outer ring member toward the first side in the axial direction and the second outer ring member toward the second side in the axial direction in accordance with the movement of the pressing bodies in the radially inward direction.

In a third aspect of a double-stage structure according to the present invention where the inner ring has first and second inner ring members, and the outer ring has first and second outer ring members, the power-transmitting case has a peripheral wall having an engagement surface directly or indirectly engaged with the outer circumferential surfaces of the first and second outer ring members, a first end wall blocking the first side in the axial direction of the peripheral wall and having an axial hole into which the rotational shaft is inserted, a second end wall blocking the second side in the axial direction of the peripheral wall and having an access opening for access to the retainer, a first stopper engaged with the end face on the first side in the axial direction of the first outer ring member to prevent the movement of the first outer ring member toward the first side in the axial direction, and a second stopper engaged with the end face on the second side in the axial direction of the second outer ring member to prevent the movement of the second outer ring member toward the second side in the axial direction.

In the third aspect, the preloading means has an axial-direction pressing body provided in the rotational shaft such that the fixed position of the axial-direction pressing body in the axial direction is adjustable, and at least two radial-direction pressing bodies provided in the rotational shaft so as to be movable in a radial direction in reference to the axis of the rotational shaft in a state where the inner ends of the radial-direction pressing bodies each are engaged with the distal end of the axial-direction pressing body and outer the distal ends of the radial-direction pressing bodies each face a position between the first and second inner ring members.

The distal end of the axial-direction pressing body and/or the inner end of the radial-direction pressing body have a cam surface pressing the radial-direction pressing bodies in radially outward directions in accordance with the movement of the axial-direction pressing body toward the first side in the axial direction.

The distal end of the radial-direction pressing body and/or the second side in the axial direction of the first inner ring member and the first side in the axial direction of the second inner ring member have a cam surface pressing the first inner ring member toward the first side in the axial direction and the second inner ring member toward the second side in the axial direction in accordance with the movement of the radial-direction pressing bodies in radially outward direction.

In a fourth aspect of a double-stage structure according to the present invention where the inner ring has first and second inner ring members, and the outer ring has first and second outer ring members, the power-transmitting case has a peripheral wall having an engagement surface directly or indirectly engaged with the outer circumferential surfaces of the first and second outer ring members, a first end wall blocking the first side in the axial direction of the peripheral wall and having an axial hole into which the rotational shaft is inserted, a second end wall blocking the second side in the axial direction of the peripheral wall and having an access opening for access to the retainer, a first stopper engaged with the end face on the first side in the axial direction of the first outer ring member to prevent the movement of the first outer ring member toward the first side in the axial direction, and a second stopper engaged with the end face on the second side in the axial direction of the second outer ring member to prevent the movement of the second outer ring member toward the second side in the axial direction.

In the fourth aspect, the preloading means has a screw member screwed into a screw hole that is formed in the rotational axis so as to extend in the axial direction and is opened to an end face of the rotational shaft, a pressing body including a proximal end engaged with the screw member and a distal end extending in the radially outward direction from the proximal end and directly or indirectly engaged with the second side in the axial direction of the second inner ring member, and an engagement part provided on the rotational shaft so as to be directly or indirectly engaged with the end face on the first side in the axial direction of the first inner ring member.

In a preferable embodiment of the fourth aspect, the peripheral wall may have a projection extending from the engagement surface inward in the radial direction so as to partition the engagement surface into a first engagement surface on the first outer ring member side and a second engagement surface on the second outer ring member side. In this embodiment, the end faces on the first side and the second side in the axial direction of the projection act as first and second stoppers, respectively.

In a fifth aspect of a double-stage structure according to the present invention where the inner ring has first and second inner ring members, and the outer ring has first and second outer ring members, the power-transmitting case has a peripheral wall having an engagement surface directly or indirectly engaged with the outer circumferential surfaces of the first and second outer ring members so as to allow axial-direction movement of, and prevent the rotation around the axis of, the first and second outer ring members, a first end wall blocking the first side in the axial direction of the peripheral wall and having an axial hole into which the rotational shaft is inserted, and a second end wall blocking the second side in the axial direction of the peripheral wall and having an access opening for access to the retainer.

In the fifth aspect, the preloading means has a screw member screwed into a screw hole that is formed in the rotational axis so as to extend in the axial direction and is opened to an end face of the rotational shaft, a pressing body including a proximal end engaged with the screw member and a distal end extending in the radially outward direction from the proximal end and directly or indirectly engaged with the second side in the axial direction of the second inner ring member, and an engagement part provided on the rotational shaft so as to be directly or indirectly engaged with the end face on the first side in the axial direction of the first inner ring member. The first and second outer ring members are directly or indirectly engaged with each other so that the axial-direction movement of the first and second outer ring members is prevented.

In a sixth aspect of a double-stage structure according to the present invention where the inner ring has first and second inner ring members, and the outer ring has first and second outer ring members, the power-transmitting case has a peripheral wall having an engagement surface directly or indirectly engaged with the outer circumferential surfaces of the first and second outer ring members, a first end wall blocking the first side in the axial direction of the peripheral wall and having an axial hole into which the rotational shaft is inserted, a second end wall blocking the second side in the axial direction of the peripheral wall and having an access opening for access to the retainer, a first stopper engaged with the end face on the first side in the axial direction of the first outer ring member to prevent the movement of the first outer ring member toward the first side in the axial direction, and a second stopper engaged with the end face on the second side in the axial direction of the second outer ring member to prevent the movement of the second outer ring member toward the second side in the axial direction.

In the sixth aspect, one of the first and second inner ring members has an extending part extending toward an opposite direction to the other inner ring member in the axial direction from a radially intermediate portion of an opposite end face toward the side far from the other inner ring member in the axial direction and having male threads on the outer circumferential surface, and a through-hole extending in the axial direction from the opposite end face to a counter end face facing the other inner ring member at a position more outward in the radial direction than the extending part is. The preloading means has a nut screw-fitted to the male threads, and a pressing body inserted into the through-hole so that a first end is engaged with an end face of the nut and a second end is engaged with an end face of the other inner ring member.

BRIEF DESCRIPTION OF THE DRAWINGS

The above, and other objects, features and advantages of the present invention will become apparent from the detailed description thereof in conjunction with the accompanying drawings therein.

DETAILED DESCRIPTION OF THE PREFERRED EMBODIMENTS

First Embodiment

Below, one embodiment of the power-transmitting mechanism with rolling-element bearing of the present invention will now be described with reference to the appended drawings.

Figure 1:
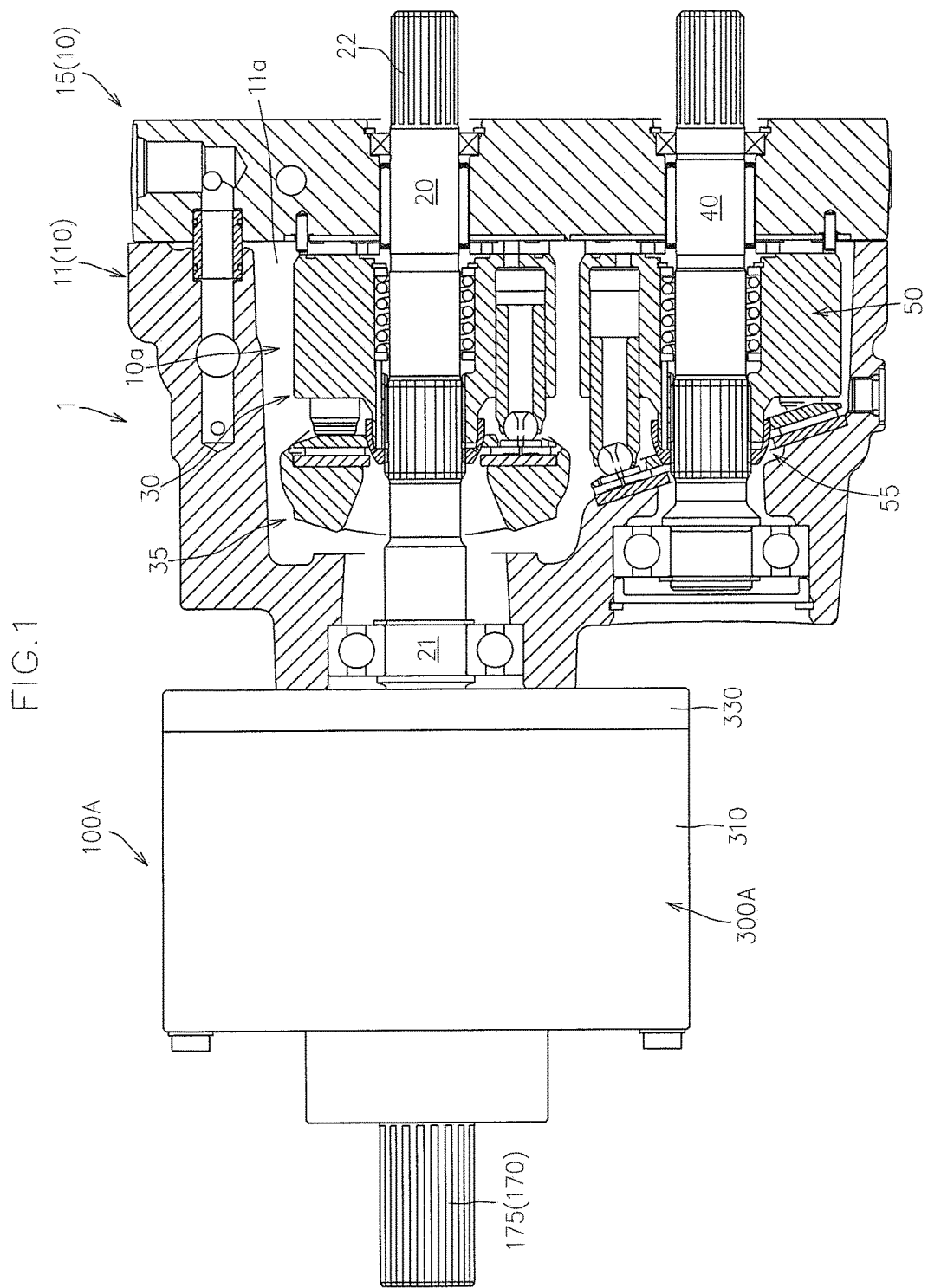
FIG. 1 is a cross-sectional view of a hydrostatic transmission to which a power-transmitting mechanism with rolling-element bearing according to a first embodiment of the present invention is applied as an accelerating power-transmitting mechanism.

FIG. 1 shows a cross-sectional view of a hydrostatic transmission (HST) 1 to which a power-transmitting mechanism with rolling-element bearing 100A according to this embodiment is applied.

Figure 2:
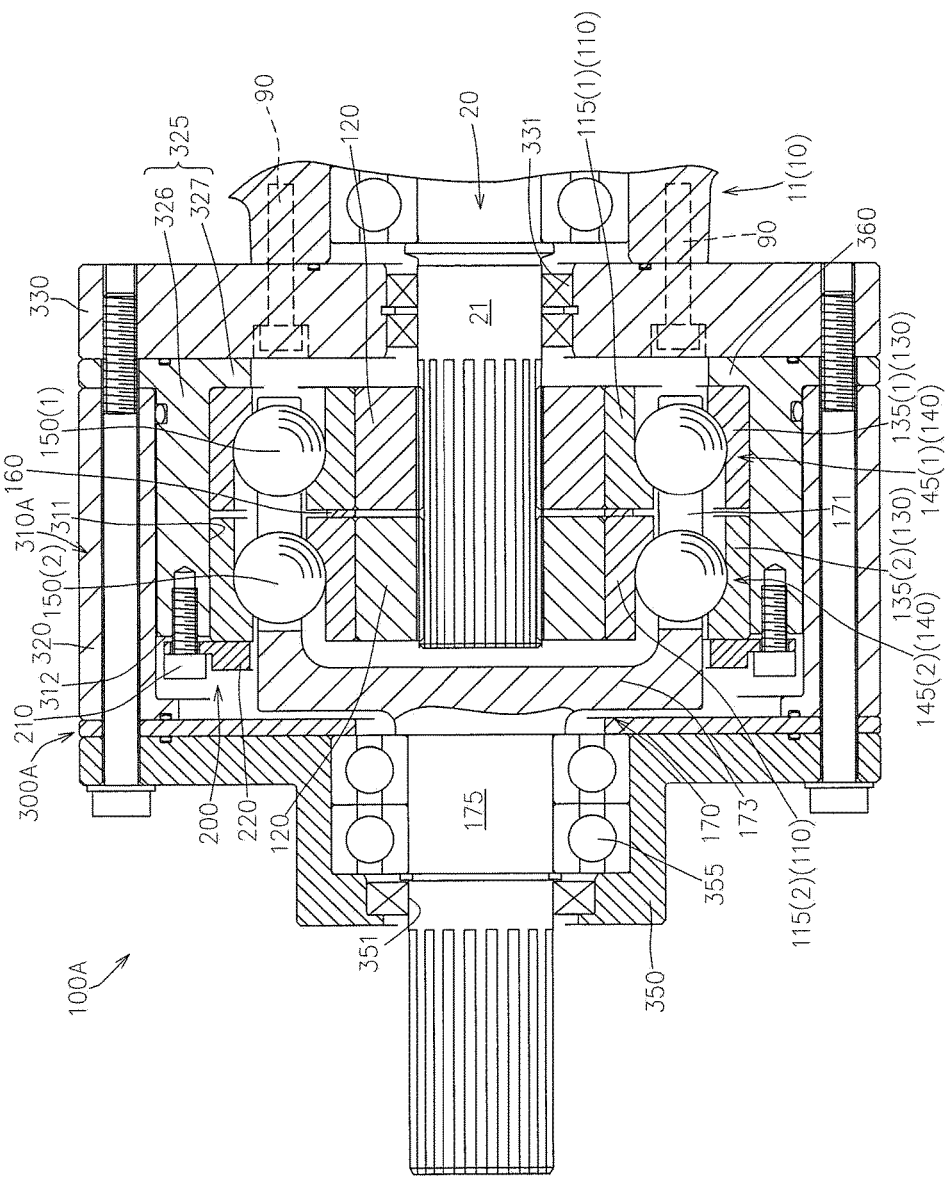
FIG. 2 is a cross-sectional view of the power-transmitting mechanism with rolling-element bearing according to the first embodiment.

Also, FIG. 2 shows a cross-sectional view of the power-transmitting mechanism with rolling-element bearing 100A according to this embodiment.

First, the HST 1 will now be described.

As shown in FIG. 1, the HST 1 includes an HST case 10, a pump shaft 20 and a motor shaft 40 supported by the HST case 10 so as to be rotatable around the respective axes, a hydraulic pump 30 supported by the pump shaft 20 so as to be incapable of relative rotation and accommodated in the HST case 10, and a hydraulic motor 50 supported by the motor shaft 40 so as to be incapable of relative rotation and accommodated in the HST case 10.

The pump shaft 20 has a first end 21 forming an input end that is operatively connected to a driving source (not shown).

In this embodiment, as shown in FIG. 1, the pump shaft 20 is supported by the HST case 10 so as to be rotatable around the axis such that the first end 21 that forms the input end and a second end 22 on the opposite side from the first end 21 both extend outward from the HST case 10.

The second end 22 of the pump shaft 20 acts as an output end that outputs rotary power to a driven member, such as a charge pump, to be driven by rotary power from the driving source.

The motor shaft 40 acts as an output shaft of the HST 1.

The motor shaft 40 is supported by the HST case 10 so as to be rotatable around the axis such that the end that forms an output end extends outward from the HST case 10.

In this embodiment, as shown in FIG. 1, the motor shaft 40 is disposed parallel to the pump shaft 20, and the end of the motor shaft 40 on the same side as the second end 22 of the pump shaft 20 extends outward from the HST case 10 so as to serve as an output end.

The hydraulic pump 30 and the hydraulic motor 50 are fluidly connected to each other, and at least one of which has a variable volume.

Specifically, the HST 1 has a pump swash plate 35 and a motor swash plate 55 that define the capacities of the hydraulic pump 30 and the hydraulic motor 50, respectively.

As shown in FIG. 1, in this embodiment, the pump swash plate 35 is a movable swash plate, and the motor swash plate 55 is a fixed swash plate.

The HST case 10 is formed with a pair of hydraulic oil passages (not shown) that fluidly connect the hydraulic pump 30 and the hydraulic motor 50.

Specifically, the HST case 10 has an HST case body 11 with an opening 11a on one side in the rotational axis direction and a port block 15 removably connected to the HST case 11 so as to block the opening 11a.

The hydraulic pump 30 and the hydraulic motor 50 are in sliding-contact with the inner surface of the port block 15 and are accommodated in an HST accommodating space 10a defined by the HST case body 11 and the port block 15.

In this configuration, the pair of hydraulic oil passages are formed in the port block 15.

As shown in FIGS. 1 and 2, the power-transmitting mechanism 100A includes an inner ring 110 directly or indirectly supported by a rotational shaft so as to be incapable of relative rotation, an outer ring 130 surrounding the inner ring 110 such that there is a gap between the inner circumferential surface of the outer ring member 130 and the outer circumferential surface of the inner ring 110, a plurality of rolling elements 150 held by the inner ring 110 and the outer ring 130 therebetween, a retainer 170 that retains the plurality of rolling elements 150 at predetermined intervals in the circumferential direction and rotates around the same axis as the inner ring 110 in conjunction with the orbital rotation of the plurality of rolling elements 150, and a preloading means 200 exerting a pressing force in the axial direction on one of the inner ring 110 and the outer ring 130 to exert a preload between the inner ring 110 and the outer ring 130.

The power-transmitting mechanism 100A according to this embodiment is attached to the HST 1 as an accelerating power-transmitting mechanism.

That is, the power-transmitting mechanism 100A is attached to the HST 1 so as to input rotary power operatively transmitted from the driving source into the retainer 170, accelerate the rotary power input into the retainer 170, and output the accelerated rotary power from the inner ring 110 to the pump shaft 20 that acts as the rotational shaft.

As shown in FIGS. 1 and 2, the power-transmitting mechanism 100A according to this embodiment further includes a power-transmitting case 300A accommodating the inner ring 110, the plurality of rolling elements 150, the outer ring 130, and the retainer 170, so as to allow access to the inner ring 110 and the retainer 170 from outside.

The power-transmitting case 300A is configured to be removably connected to the HST case 10 via a fastening member 90, such as a bolt, such that the retainer 170 can be operatively connected to the driving source, and the inner ring 110 is directly or indirectly connected to the pump shaft 20 so as to be incapable of relative rotation.

An insertion hole for the fastening member 90 has a sealing means (not shown) that prevents the leakage of oil present in the power-transmitting case 300A. The sealing means can be provided between the head of the fastening member 90 and the bottom surface of the spotfaced part of the insertion hole, or can be provided so as to cover the open end of the insertion hole.

The inner ring 110 includes a plurality of inner ring members 115 disposed in series in the axial direction, and the outer ring 130 includes a plurality of outer ring members 135 respectively cooperating with the plurality of inner ring members 115.

As shown in FIG. 2, in this embodiment, the inner ring 110 has first and second inner ring members 115(1), 115(2) disposed in series in order of a first side, which is one side in the axial direction, to a second side, which is the other side or the opposite side to the first side in the axial direction, as the plurality of inner ring members 115, and the outer ring 130 has first and second outer ring members 135(1), 135(2) respectively cooperating with the first and second inner ring members 115(1), 115(2) as the plurality of outer ring members 135.

The first and second inner ring members 115(1), 115(2) are supported by the pump shaft 20 so as to be incapable of relative rotation.

In this embodiment, the first and second inner ring members 115(1), 115(2) are supported by the pump shaft 20 so as to be relatively movable in the axial direction.

As shown in FIG. 2, in this embodiment, ring-shaped inner collar members 120 are respectively disposed inside the first and second inner ring members 115(1), 115(2) by press-fitting, shrink-fitting, expansion-fitting, or the like so as to be incapable of relative rotation and incapable of relative axial-direction movement.

The inner circumferential surfaces of the inner collar members 120 have splines that can be connected to splines formed in the pump shaft 20.

In this way, by disposing the inner collar members 120 inside the first and second inner ring members 115(1), 115(2) so as to be incapable of relative rotation and incapable of relative axial-direction movement and spline-connecting the inner collar members 120 to the corresponding rotational shaft (the pump shaft 20 in this embodiment), power transmission loss between the rotational shaft (the pump shaft 20) and the first and second inner ring members 115(1), 115(2) can be prevented or reduced.

The first and second outer ring members 135(1), 135(2) are accommodated in the power-transmitting case 300A so as to be incapable of rotation around the axis.

In this embodiment, at least the outer ring member pressed in the axial direction by the preloading means 200 (the second outer ring member 145(2) in this embodiment) is movable in the axial direction.

As shown in FIG. 2, the power-transmitting case 300A has a peripheral wall 310A, a first end wall 330 blocking the first side in the axial direction of the peripheral wall 310A and having an axial hole 331 into which the pump shaft 20 is inserted, and a second end wall 350 blocking the second side in the axial direction of the peripheral wall 310A and having an access opening 351 for access to the retainer 170.

As shown in FIG. 2, the peripheral wall 310A has an engagement surface 311 directly or indirectly engaged with the outer circumferential surfaces of the first and second outer ring members 145(1), 145(2) so as to allow axial-direction movement of at least the outer ring member (the second outer ring member 145(2) in this embodiment) pressed in the axial direction by the preloading means 200.

The engagement surface 311 terminates at a position more toward the first side in the axial direction than the second end wall 350 is. The peripheral wall 310A further has an attachment surface 312 extending from the end on the second side in the axial direction of the engagement surface 311 outward in the radial direction with reference to the axis of the rotational shaft (the pump shaft 20) and facing the second side in the axial direction.

In this embodiment, the peripheral wall 310A is formed of a hollow first cylinder 320 and a hollow second cylinder 325 disposed inside the first cylinder 320.

Specifically, the second cylinder 325 has a hollow axial-direction extending part 326 disposed inside the first cylinder 320 and a radial-direction extending part 327 extending in the radial direction from the end on the first side in the axial direction of the axial-direction extending part 326. The inner circumferential surface of the axial-direction extending part 326 forms the engagement surface 311, and the end face on the second side in the axial direction of the axial-direction extending part 326 forms the attachment surface 312.

Preferably, an inner ring and an outer ring for use with commercially available angular contact ball bearings, which are of high precision and yet low cost due to mass production, may be used for the inner ring members 115(1), 115(2) and the outer ring members 135(1), 135(2).

Also, preferably, as shown in FIG. 2, the plurality of inner ring members 115(1), 115(2) have the same configuration, and the plurality of outer ring members 135(1), 135(2) have the same configuration.

Accordingly, costs can be reduced thanks to reduction of the number of component kinds.

Some of the plurality of rolling elements 150 are interposed between the first inner ring member 115(1) and the first outer ring member 135(1) and act as first rolling elements 150(1) that transmit power between the first inner ring member 115(1) and the first outer ring member 135(1). The rest of the plurality of rolling elements 150 are interposed between the second inner ring member 115(2) and the second outer ring member 135(2) and act as second rolling elements 150(2) that transmit power between the second inner ring member 115(2) and the second outer ring member 135(2).

The retainer 170 has a plurality of partitions 171 retaining the plurality of rolling elements 150(1), 150(2) at predetermined intervals in the circumferential direction such that the rolling elements disposed in the circumferential direction on the first side in the axial direction (the first rolling elements 150(1)) and the rolling elements disposed in the circumferential direction on the second side in the axial direction (the second rolling elements 150(2)) respectively orbit the corresponding inner ring members 115(1), 115(2) in a synchronized manner, and a connector 173 connecting the plurality of partitions 171 such that the plurality of partitions 171 integrally rotate around the axis of the inner ring members 115(1), 115(2).

Figure 3:
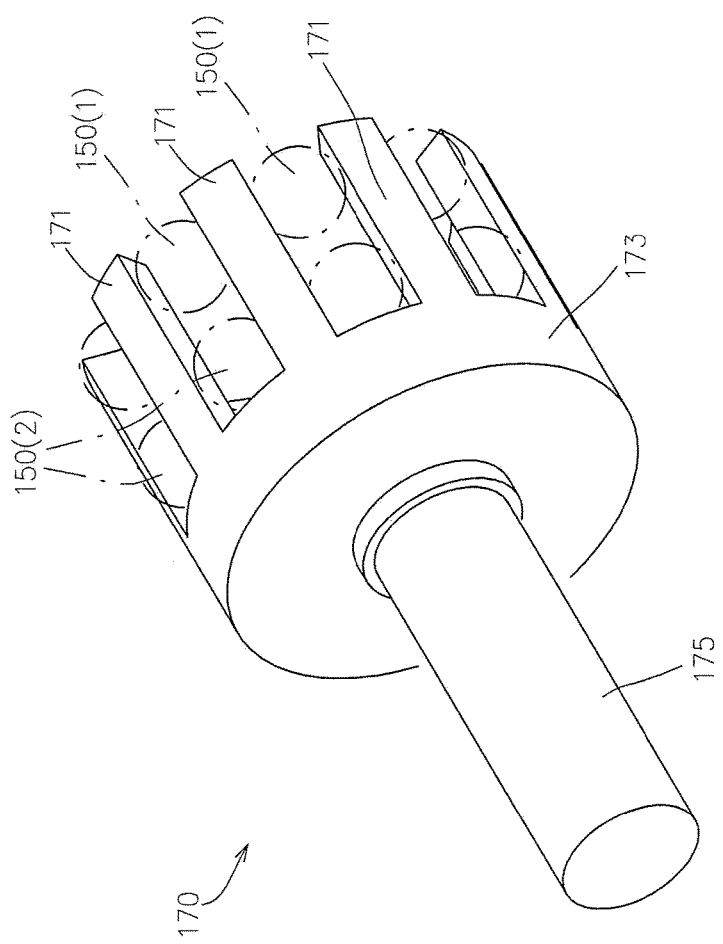
FIG. 3 is a perspective view of a retainer of the power-transmitting mechanism with rolling-element bearing.

FIG. 3 shows a perspective view of the retainer 170.

In this embodiment, as shown in FIGS. 2 and 3, the retainer 170 further has a shaft 175 connected to the connector 173 so as to rotate around the axis of the inner ring members 115(1), 115(2) together with the connector 173.

The shaft 175 extends outward via an access opening 351 provided in the second end wall 350 and is supported by a bearing member 355 so as to be rotatable around the axis.

In this embodiment, the preloading means 200 is configured to press the second outer ring member 135(2) toward the first side in the axial direction. By the second outer ring member 135(2) being pressed toward the first side in the axial direction, a preload necessary for power transmission is produced between the second outer ring member 135(2) and the second inner ring member 115(2) and between the first inner ring member 115(1) and the first outer ring member 135(1).

Specifically, as shown in FIG. 2, the power-transmitting case 300A has a stopper 360 engaged with the end face on the first side in the axial direction of the first outer ring member 135(1) to prevent the movement of the first outer ring member 135(1) toward the first side in the axial direction.

In this embodiment, the radial-direction extending part 327 of the second cylinder 325 forms the stopper 360.

Then, a pressing force exerted on the second outer ring member 135(2) by the preloading means 200 is transmitted from the second outer ring member 135(2) to the second inner ring member 115(2) via the second rolling elements 150(2) as a force that presses the second inner ring member 115(2) toward the first side in the axial direction.

That is, the inner circumferential surface of the second outer ring member 135(2) engaged with the second rolling elements 150(2) has an angular race toward the first side in the axial direction and inward in the radial direction, and, on the other hand, the outer circumferential surface of the second inner ring member 115(2) engaged with the second rolling elements 150(2) has an angular race toward the second side in the axial direction and outward in the radial direction. Accordingly, a preload is exerted between the second outer ring member 135(2) and the second inner ring member 115(2) by the preloading means 200.

The first inner ring member 115(1) is disposed so as to be pressed toward the first side in the axial direction by the second inner ring member 115(2). The pressing force toward the first side in the axial direction transmitted from the second inner ring member 115(2) via the first rolling elements 150(1) to the first inner ring member 115(1) is transmitted from the first inner ring member 115(1) to the first outer ring member 135(1), the movement of which toward the first side in the axial direction is prevented by the stopper 360, as a force that presses the first outer ring member 135(1) toward the first side in the axial direction.

That is, the outer circumferential surface of the first inner ring member 115(1) engaged with the first rolling elements 150(1) has an angular race toward the first side in the axial direction and outward in the radial direction, and, on the other hand, the inner circumferential surface of the first outer ring member 135(1) engaged with the first rolling elements 150(1) has an angular race toward the second side in the axial direction and inward in the radial direction. Accordingly, a preload is exerted between the first inner ring member 115(1) and the first outer ring member 135(1).

According to this configuration, rotary power operatively input into the retainer 170 from the driving source is transmitted to the pump shaft 20 via two parallel power-transmitting paths, i.e., a first power-transmitting path from the first rolling elements 150(1) to the pump shaft 20 via the first inner ring member 115(1) (and the inner collar member 120 in this embodiment) and a second power-transmitting path from the second rolling elements 150(2) to the pump shaft 20 via the second inner ring member 115(2) (and the inner collar member 120 in this embodiment).

Accordingly, in comparison to conventional power-transmitting mechanisms with rolling-element bearing, the torque of rotary power that can be transmitted in various speeds can be increased.

The preloading means 200 has a pressing body 220 that is directly or indirectly engaged with the second side in the axial direction of the second outer ring member 135(2) and that is attached to the peripheral wall 310A so as to be movable in the axial direction.

In this embodiment, as shown in FIG. 2, the peripheral wall 310A has a screw hole that is open to the attachment surface 312 and extends in the axial direction, and the pressing body 220 is fixed in place by a screw 210 screwed into the screw hole.

In this embodiment, as shown in FIG. 2, a shim 160 is interposed between the first inner ring member 115(1) and the second inner ring member 115(2).

In this configuration, varying the thickness of the shim 160 and/or increasing or decreasing the number of shims 160 before screwing the screw 210 makes it possible to adjust the preload attained after screwing the screw 210.

Moreover, according to this embodiment, unintentional rotation of the first and second outer ring members 135(1), 135(2) can be effectively prevented.

That is, the second outer ring member 135(2) is brought into contact with the pressing body 220, which is incapable of rotation, and is pressed toward the first side in the axial direction.

Accordingly, unintentional rotation of the second outer ring member 135(2) can be effectively prevented by frictional force between the pressing body 220 and the second outer ring member 135(2).

On the other hand, the first outer ring member 135(1) is pressed against the stopper 360 fixed to the power-transmitting case 300A, which is a fixed member, and thus movement toward the first side in the axial direction is prevented.

Accordingly, unintentional rotation of the first outer ring member 135(1) can be effectively prevented by frictional force between the stopper 360 and the first outer ring member 135(1).

Second Embodiment

Below, another embodiment of the power-transmitting mechanism with rolling-element bearing of the present invention will now be described with reference to the appended drawings.

Figure 4:
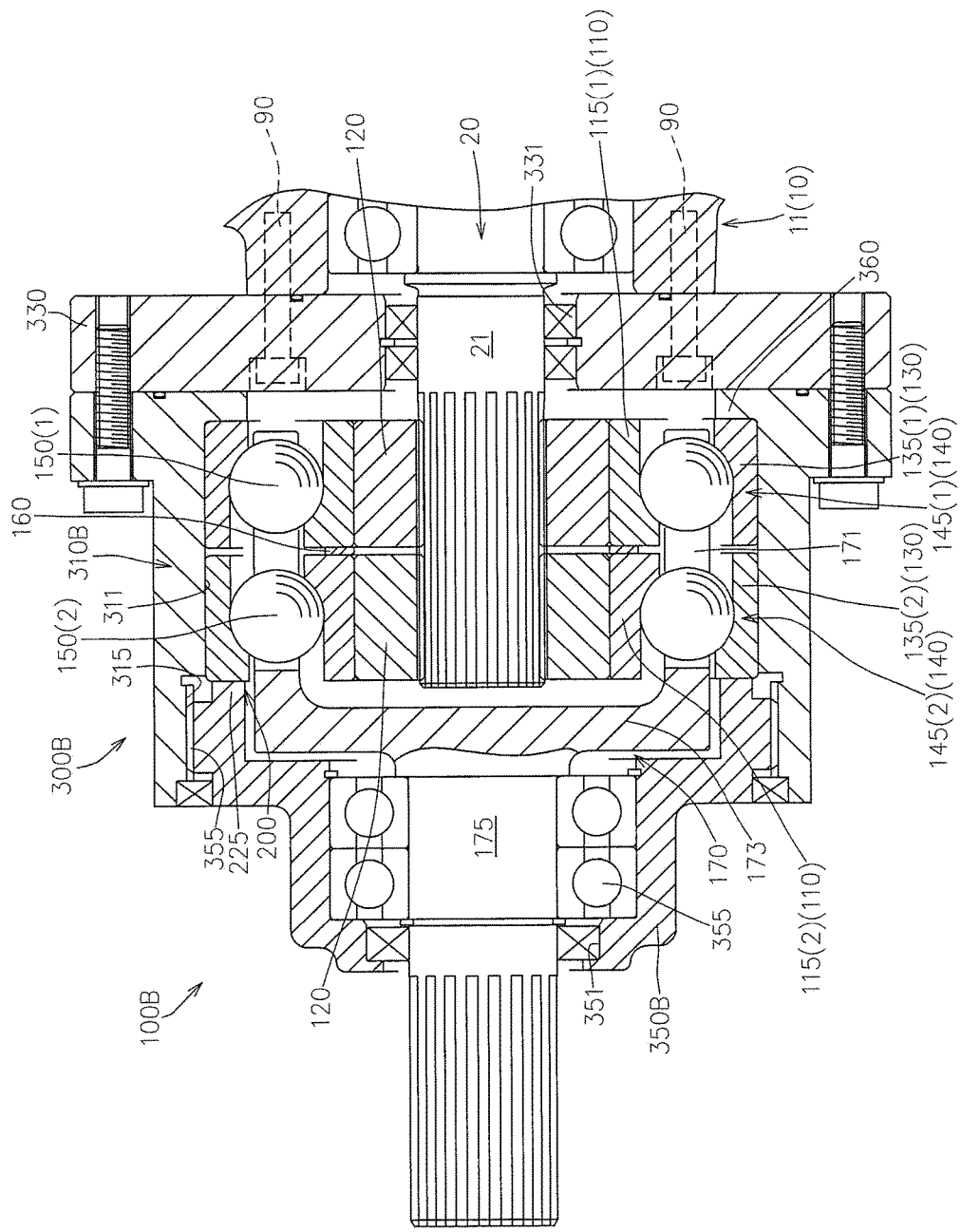
FIG. 4 is a cross-sectional view of a power-transmitting mechanism with rolling-element bearing according to a second embodiment of the present invention.

FIG. 4 shows a cross-sectional view of a power-transmitting mechanism with rolling-element bearing 100B according to this embodiment.

In the drawings, substantially the same components as those in the first embodiment are given the same reference numbers, and descriptions thereof are omitted as appropriate.

The power-transmitting mechanism 100B according to this embodiment is different from the power-transmitting mechanism with rolling-element bearing 100A according to the first embodiment with respect to the specific configuration of the preloading means 200.

Specifically, in comparison to the power-transmitting mechanism with rolling-element bearing 100A of the first embodiment, the power-transmitting mechanism with rolling-element bearing 100B has a power-transmitting case 300B in place of the power-transmitting case 300A.

As shown in FIG. 4, the power-transmitting case 300B has a peripheral wall 310B, a first end wall 330 blocking the first side in the axial direction of the peripheral wall 310B and having an axial hole 331 into which the rotational shaft (the pump shaft 20) is inserted, and a second end wall 350B blocking the second side in the axial direction of the peripheral wall 310B and having an access opening 351 for access to the retainer 170.

In this embodiment, the second side in the axial direction of the peripheral wall 310B is an opening having a size that enables the first and second outer ring members 135(1), 135(2) to be inserted, and the second end wall 350B is removably attached to the peripheral wall 310B so as to block the opening.

Specifically, as shown in FIG. 4, the peripheral wall 310B has an engagement surface 311 directly or indirectly engaged with the outer circumferential surfaces of the first and second outer ring members 135(1), 135(2) so as to allow axial-direction movement of at least the outer ring member (the second outer ring member 145(2) in this embodiment) pressed in the axial direction by the preloading means 200.

The engagement surface 311 terminates at a position more toward the first side in the axial direction than the opening on the second side in the axial direction of the peripheral wall 310B is.

The inner circumferential surface of the peripheral wall 310B has female threads 315 at a position more toward the second side in the axial direction than the engagement surface 311 is.

The outer circumferential surface of the second end wall 350B has male threads 355 that can be screw-fitted to the female threads 315, and the second end wall 350B is removably attached to the peripheral wall 310B via the male threads 355.

In this embodiment, the preloading means 200 has a pressing body 225 provided in the second end wall 350B so as to be directly or indirectly engaged with the second side in the axial direction of the second outer ring member 135(2).

That is, in this embodiment, screwing the second end wall 350B into the peripheral wall 310B in a state in which the first inner ring member 115(1), the first rolling elements 150(1), the first outer ring member 135(1), the second inner ring member 115(2), the second rolling elements 150(2), the second outer ring member 135(2), and the retainer 170 are installed simultaneously completes setting the preload.

The power-transmitting mechanism 100B according to this embodiment can also provide the same effect as the power-transmitting mechanism 100A according to the first embodiment.

Third Embodiment

Below, still another embodiment of the power-transmitting mechanism with rolling-element bearing of the present invention will now be described with reference to the appended drawings.

Figure 5:
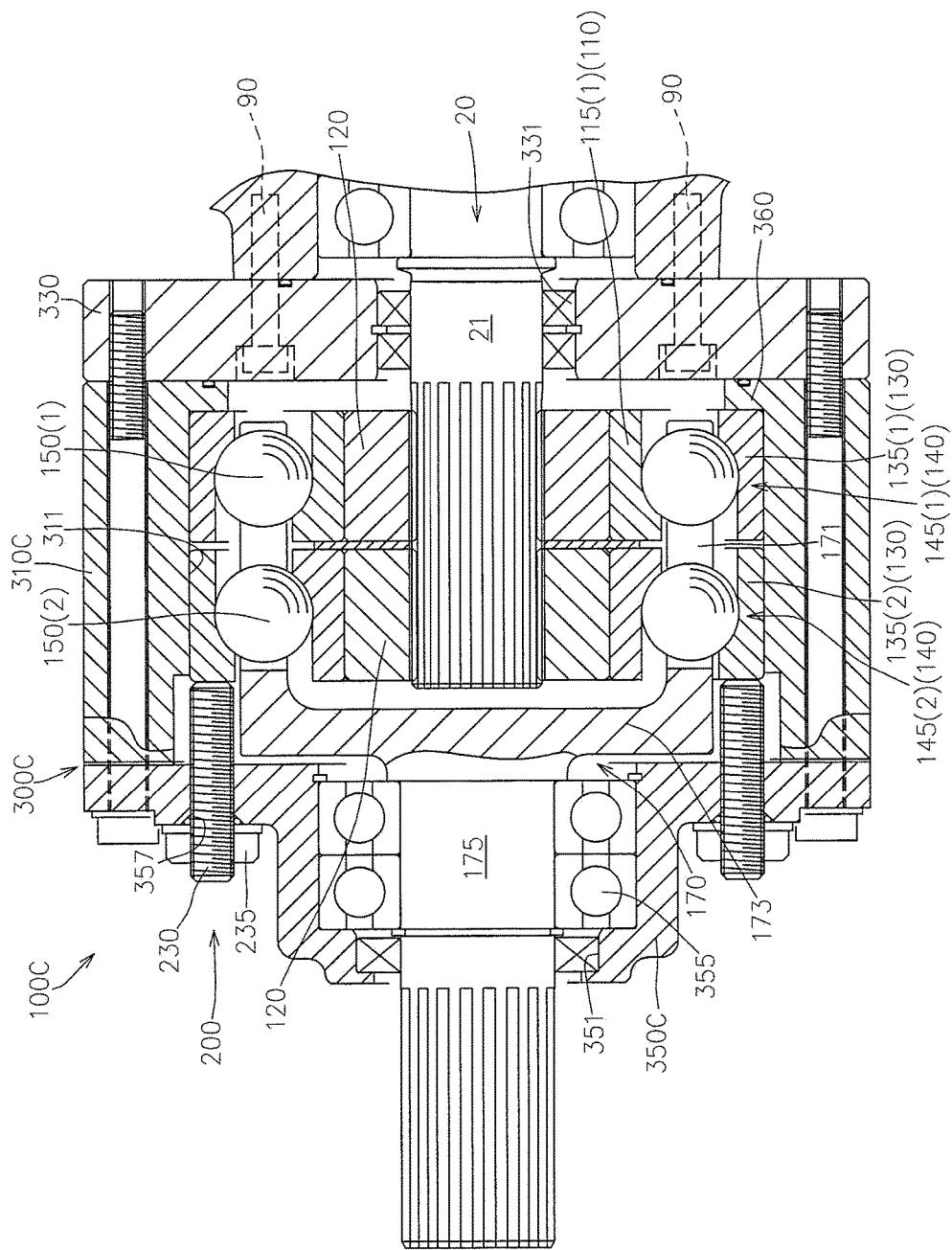
FIG. 5 is a cross-sectional view of a power-transmitting mechanism with rolling-element bearing according to a third embodiment of the present invention.

FIG. 5 shows a cross-sectional view of a power-transmitting mechanism with rolling-element bearing 100C according to this embodiment.

In the drawings, substantially the same components as those in the first and second embodiments are given the same reference numbers, and descriptions thereof are omitted as appropriate.

The power-transmitting mechanism 100C according to this embodiment is different from the power-transmitting mechanisms with rolling-element bearing 100A, 100B according to the first and second embodiments with respect to the specific configuration of the preloading means 200.

Specifically, in comparison to the power-transmitting mechanism with rolling-element bearing 100A according to the first embodiment, the power-transmitting mechanism with rolling-element bearing 100C has a power-transmitting case 300C in place of the power-transmitting case 300A.

As shown in FIG. 5, the power-transmitting case 300C has a peripheral wall 310C, a first end wall 330 blocking the first side in the axial direction of the peripheral wall 310C and having an axial hole 331 into which the rotational shaft (the pump shaft 20) is inserted, and a second end wall 350C blocking the second side in the axial direction of the peripheral wall 310C and having an access opening 351 for access to the retainer 170.

The peripheral wall 310C has an engagement surface 311 directly or indirectly engaged with the outer circumferential surfaces of the first and second outer ring members 135(1), 135(2) so as to allow axial-direction movement of at least the outer ring member (the second outer ring member 145(2) in this embodiment) pressed in the axial direction by the preloading means 200.

In this embodiment, the preloading means 200 has a pressing body 230 penetrating the second end wall 350C such that the distal end is directly or indirectly engaged with the second side in the axial direction of the second outer ring member 135(2), and the fixed position of the pressing body 230 in the axial direction is adjustable.

In this embodiment, as shown in FIG. 5, the second end wall 350C has a screw hole 357 penetrating in the axial direction at a position corresponding to the second outer ring member 135(2) with respect to the radial direction.

The pressing body 230 is a screw member screwed into the screw hole 357 of the second end wall 350C, and the distal end of the pressing body 230 is engaged with the end face on the second side in the axial direction of the second outer ring member 135(2). The pressing body 230 is moved in the axial direction in accordance with the amount of insertion into the screw hole 357, and the axial-direction position of the pressing body 230 can be fixed by a nut 235 screw-fitted to the outward extending part of the pressing body 230.

In this case, the preload can be adjusted in a stepless manner in accordance with the amount of insertion of the pressing body 230.

The power-transmitting mechanism with rolling-element bearing 100C according to this embodiment can also provide the same effect as the power-transmitting mechanisms with rolling-element bearing 100A, 100E according to the first and second embodiments.

Fourth Embodiment

Below, yet another embodiment of the power-transmitting mechanism with rolling-element bearing of the present invention will now be described with reference to the appended drawings.

Figure 6:
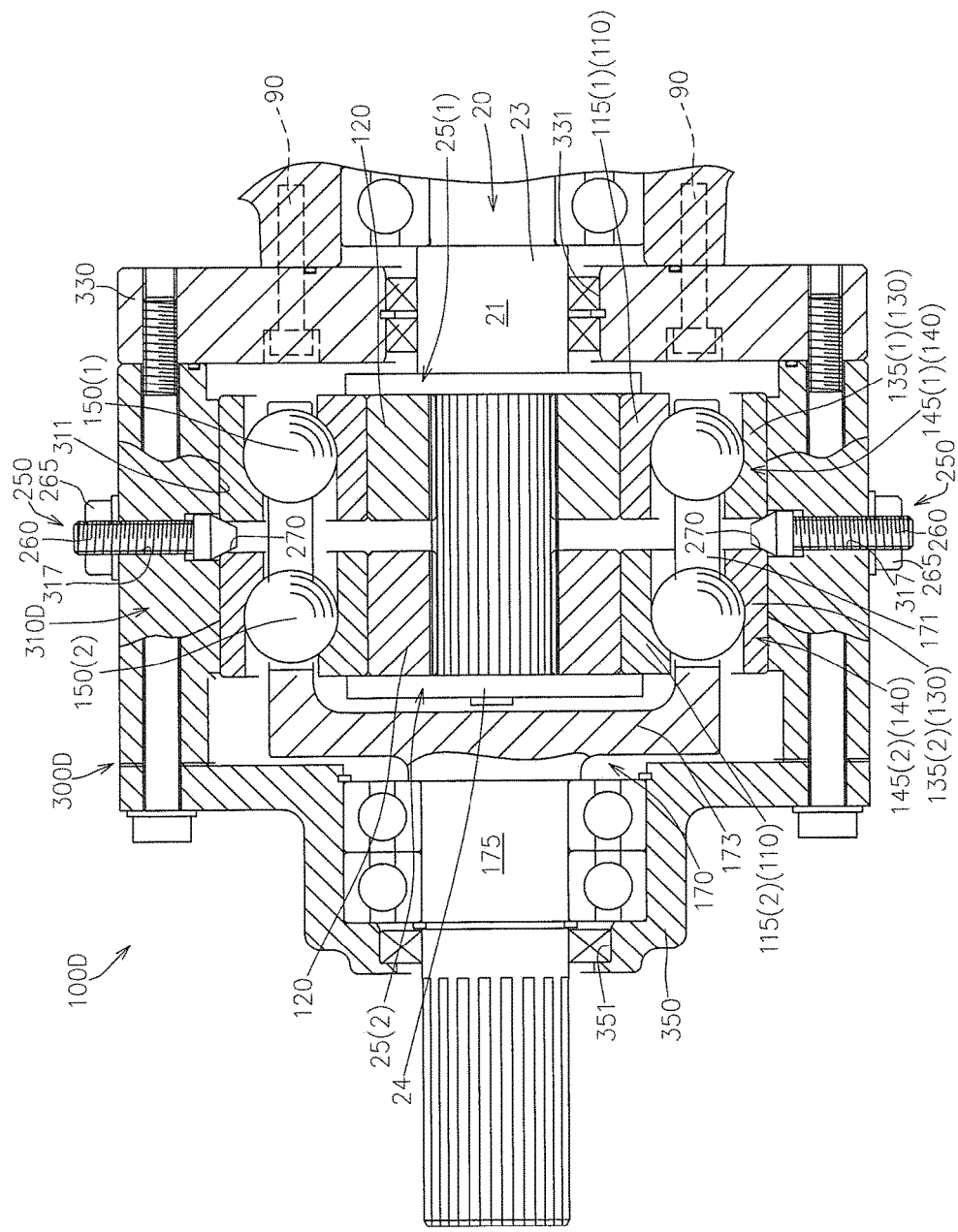
FIG. 6 is a cross-sectional view of a power-transmitting mechanism with rolling-element bearing according to a fourth embodiment of the present invention.

FIG. 6 shows a cross-sectional view of a power-transmitting mechanism with rolling-element bearing 100D according to this embodiment.

In the drawings, substantially the same components as those in the first to third embodiments are given the same reference numbers, and descriptions thereof are omitted as appropriate.

The power-transmitting mechanism with rolling-element bearing 100D according to this embodiment is different from the power-transmitting mechanisms with rolling-element bearing 100A to 100C according to the first to third embodiments mainly with respect to a preloading means 250 that presses the first and second outer ring members 135(1), 135(2) respectively toward the first side and the second side in the axial direction and is provided in place of the preloading means 200 that presses the second outer ring member 135(2) toward the first side in the axial direction, and with respect to the first and second inner ring members 115(1), 115(2) fixed in the axial direction.

Specifically, as shown in FIG. 6, the rotational shaft (the pump shaft 20) has a first stopper 25(1) directly or indirectly engaged with the end face on the first side in the axial direction of the first inner ring member 115(1) to prevent the movement of the first inner ring member 115(1) toward the first side in the axial direction, and a second stopper 25(2) directly or indirectly engaged with the end face on the second side in the axial direction of the second inner ring member 115(2) to prevent the movement of the second inner ring member 115(2) toward the second side in the axial direction.

The first stopper 25(1) is brought into contact with the end face on the first side in the axial direction of the inner collar member 120 disposed inside the first inner ring member 115(1) so as to be incapable of relative rotation, and thus prevents the movement of the first inner ring member 115(1) toward the first side in the axial direction.

In this embodiment, the pump shaft 20 has a large-diameter part 23 adjacent to the first side in the axial direction of a spline part that is spline-connected to the inner collar members 120 disposed inside the first and second inner ring members 115(1), 115(2) so as to be incapable of relative rotation, and the large-diameter part 23 forms the first stopper 25(1).

The second stopper 25(2) is brought into contact with the end face on the second side in the axial direction of the inner collar member 120 disposed inside the second inner ring member 115(2) so as to be incapable of relative rotation, and thus prevents the movement of the second inner ring member 115(2) toward the second side in the axial direction.

In this embodiment, a plate 24 having a larger diameter than the spline part is firmly attached to the end face on the second side in the axial direction of the pump shaft 20, and the plate 24 forms the second stopper 25(2).

In comparison to the power-transmitting mechanism with rolling-element bearing 100A of the first embodiment, the power-transmitting mechanism with rolling-element bearing 100D has a power-transmitting case 300D in place of the power-transmitting case 300A.

As shown in FIG. 6, the power-transmitting case 300D has a peripheral wall 310D having an engagement surface 311 directly or indirectly engaged with the outer circumferential surfaces of the first and second outer ring members 135(1), 135(2) so as to allow axial-direction movement of the first and second outer ring members 135(1), 135(2), a first end wall 330 blocking the first side in the axial direction of the peripheral wall 310D and having an axial hole 331 into which the pump shaft 20 is inserted, and a second end wall 350 blocking the second side in the axial direction of the peripheral wall 310D and having an access opening 351 for access to the retainer 170.

In this embodiment, the preloading means 250 has at least two pressing bodies 260 provided to penetrate the peripheral wall 310D such that the distal ends face a position between the first and second outer ring members 135(1), 135(2), and the fixed positions of the pressing bodies 260 in the radial direction in reference to the axis of the pump shaft 20 are adjustable.

Preferably, the at least two pressing bodies 260 are disposed at equal intervals in the circumferential direction in reference to the axis of the pump shaft 20.

That is, in a case where two pressing bodies 260 are provided, the two pressing bodies 260 are disposed at intervals of 180 degrees, and in a case where three pressing bodies 260, the three pressing bodies 260 are disposed at intervals of 120 degrees.

As shown in FIG. 6, in this embodiment, the peripheral wall 310D has screw holes 317 extending in the radial direction in reference to the axis of the pump shaft 20 such that the inner ends are open to the engagement surface 311 at a position between the first and second outer ring members 135(1), 135(2), and the outer ends are open to the outer circumferential surface.

The pressing bodies 260 are screw members screwed into the screw holes 317 and moved in the radial direction in accordance with the amount of insertion into the screw holes 317, and the radial-direction positions can be fixed by nuts 265 screw-fitted to the outward extending parts of the pressing bodies 260.

In this case, the preload can be adjusted in a stepless manner in accordance with the amount of insertion of the pressing bodies 260.

The distal ends of the pressing bodies 260, and/or the second side in the axial direction of the first outer ring member 135(1) and the first side in the axial direction of the second outer ring member 135(2), have a cam surface 270 that presses the first outer ring member 135(1) toward the first side in the axial direction and the second outer ring member 135(2) toward the second side in the axial direction in accordance with the movement of the pressing bodies 260 in the radially inward direction.

As shown in FIG. 6, in this embodiment, the cam surface 270 is provided at the distal ends of the pressing bodies 260.

That is, the first outer ring member 135(1) pressed toward the first side in the axial direction by the preloading means 250 has an inner circumferential surface engaged with the first rolling elements 150(1), and the inner circumferential surface has an angular race facing the first side in the axial direction and inward in the radial direction. On the other hand, the first inner ring member 115(1), the movement of which toward the first side in the axial direction is prevented by the first stopper 25(1), has an outer circumferential surface engaged with the first rolling elements 150(1), and the outer circumferential surface has an angular race facing the second side in the axial direction and outward in the radial direction. Accordingly, a preload is exerted between the first inner ring member 115(1) and the first outer ring member 135(1).

Also, the second outer ring member 135(2) pressed toward the second side in the axial direction by the preloading means 250 has an inner circumferential surface engaged with the second rolling elements 150(2), and the inner circumferential surface has an angular race facing the second side in the axial direction and inward in the radial direction. On the other hand, the second inner ring member 115(2), the movement of which toward the second side in the axial direction is prevented by the second stopper 25(2), has an outer circumferential surface engaged with the second rolling elements 150(2), and the outer circumferential surface has an angular race facing the first side in the axial direction and outward in the radial direction. Accordingly, a preload is exerted between the second inner ring member 115(2) and the second outer ring member 135(2).

The power-transmitting mechanism with rolling-element bearing 100D according to this embodiment can also provide the same effect as the power-transmitting mechanisms with rolling-element bearing 100A to 100C according to the first to third embodiments.

Fifth Embodiment

Below, yet another embodiment of the power-transmitting mechanism with rolling-element bearing of the present invention will now be described with reference to the appended drawings.

Figure 7:
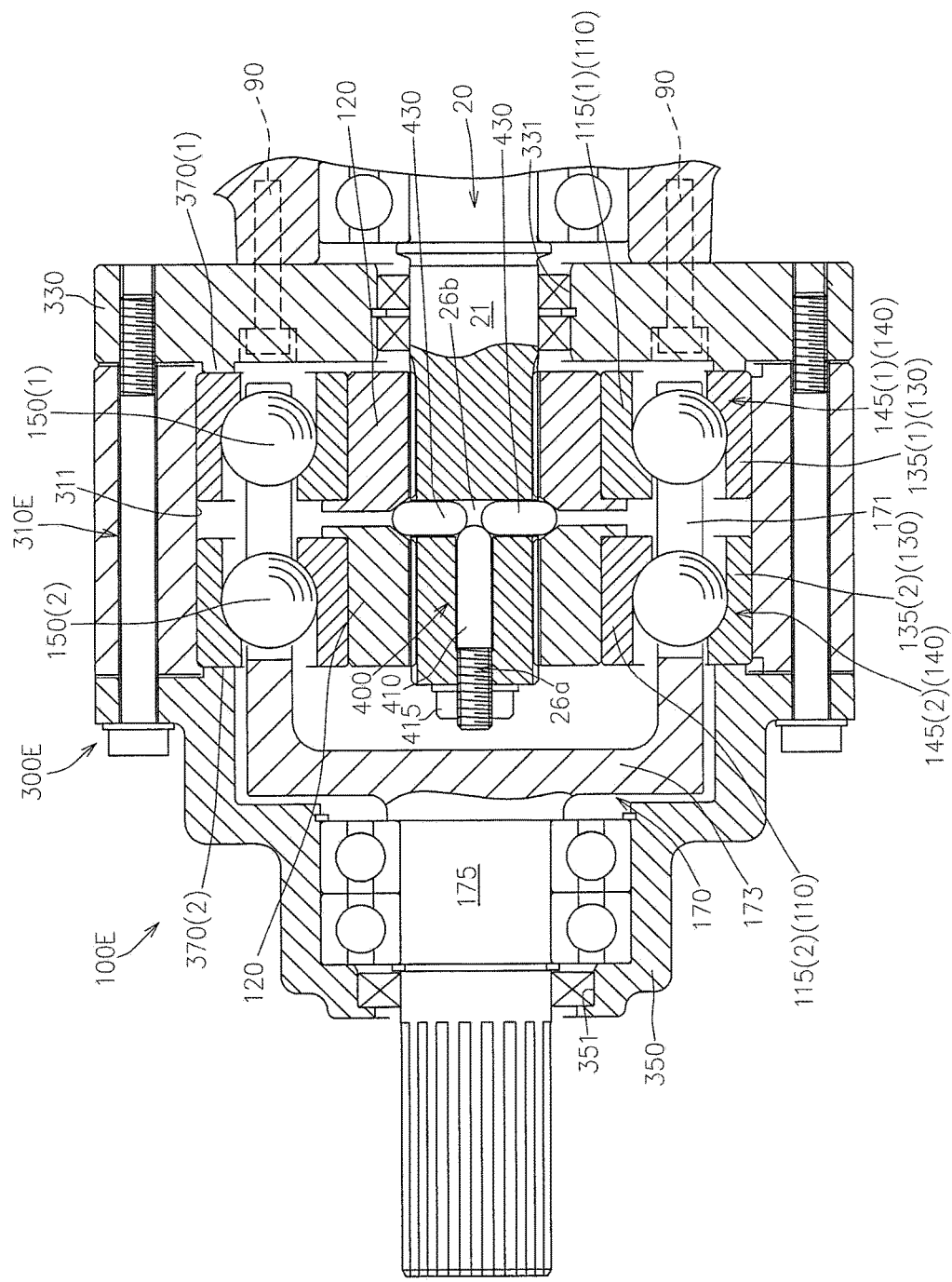
FIG. 7 is a cross-sectional view of a power-transmitting mechanism with rolling-element bearing according to a fifth embodiment of the present invention.

FIG. 7 shows a cross-sectional view of a power-transmitting mechanism with rolling-element bearing 100E according to this embodiment.

In the drawings, substantially the same components as those in the first to fourth embodiments are given the same reference numbers, and descriptions thereof are omitted as appropriate.

The power-transmitting mechanism with rolling-element bearing 100E according to this embodiment is different from the power-transmitting mechanisms with a rolling-element bearing 100A to 100D of the first to fourth embodiments mainly in that a preloading means 400 pressing the first and second inner ring members 115(1), 115(2) is provided.

Specifically, in comparison to the power-transmitting mechanism with rolling-element bearing 100A according to the first embodiment, the power-transmitting mechanism with rolling-element bearing 100E has a power-transmitting case 300E in place of the power-transmitting case 300A and the preloading means 400 pressing the first and second inner ring members 115(1), 115(2) in mutually opposite directions in place of the preloading means 200.

As shown in FIG. 7, the power-transmitting case 300E has a peripheral wall 310E having an engagement surface 311 directly or indirectly engaged with the outer circumferential surfaces of the first and second outer ring members 135(1), 135(2), a first end wall 330 blocking the first side in the axial direction of the peripheral wall 310E and having an axial hole 331 into which the pump shaft 20 is inserted, a second end wall 350 blocking the second side in the axial direction of the peripheral wall 310E and having an access opening 351 for access to the retainer 170, a first stopper 370(1) engaged with the end face on the first side in the axial direction of the first outer ring member 135(1) to prevent the movement of the first outer ring member 135(1) toward the first side in the axial direction, and a second stopper 370(2) engaged with the end face on the second side in the axial direction of the second outer ring member 135(2) to prevent the movement of the second outer ring member 135(2) toward the second side in the axial direction.

In this embodiment, the first and second end walls 330, 350 each have a projection that projects inward in the axial direction, and the projection of the first end wall 330 and the projection of the second end wall 350 act as the first and second stoppers 370(1), 370(2), respectively.

The preloading means 400 has an axial-direction pressing body 410 provided in the pump shaft 20 such that the fixed position of the pressing body 410 in the axial direction is adjustable, and at least two radial-direction pressing bodies 430 provided in the pump shaft 20 so as to be capable of radial movement in a state where the distal ends each face a position between the first and second inner ring members 115(1), 115(2).

Preferably, the at least two radial-direction pressing bodies 430 are disposed at equal intervals in the circumferential direction in reference to the axis of the pump shaft 20.

That is, in a case where two axial-direction pressing bodies 430 are provided, the two pressing bodies 430 are disposed at intervals of 180 degrees, and in a case where three axial-direction pressing bodies 430 are provided, the three pressing bodies 430 are disposed at intervals of 120 degrees.

As shown in FIG. 7, in this embodiment, the pump shaft 20 has a screw hole 26a extending in the axial direction such that one end opens to the end face of the pump shaft 20, and an attachment hole 26b extending in the radial direction in reference to the axis of the pump shaft 20 such that the inner end is in communication with the screw hole 26a, and the outer end is open to the outer circumferential surface at a position between the first and second inner ring members 115(1), 115(2).

The axial-direction pressing body 410 has a threaded part screwed into the screw hole 26a and an extending part engaged with the radial-direction pressing bodies 430.

The axial-direction pressing body 410 is moved in the axial direction in accordance with the amount of insertion into the screw hole 26a, and the axial-direction position can be fixed by a nut 415 screw-fitted to the outward extending part of the axial-direction pressing body 410.

The radial-direction pressing bodies 430 are movably accommodated in the attachment hole 26b such that the inner ends are engaged with the distal end of the axial-direction pressing body 410, and the outer ends are engaged with the second side in the axial direction of the first inner ring member 115(1) and the first side in the axial direction of the second inner ring member 115(2).

In this configuration, the distal end of the axial-direction pressing body 410 and/or the inner ends of the radial-direction pressing bodies 430 have a cam surface pressing the radial-direction pressing bodies 430 in radially outward directions in accordance with the movement of the axial-direction pressing body 410 toward the first side in the axial direction.

The distal ends of the radial-direction pressing bodies 430, and/or the second side in the axial direction of the first inner ring member 115(1) and the first side in the axial direction of the second inner ring member 115(2), have a cam surface pressing the first inner ring member 115(1) toward the first side in the axial direction and the second inner ring member 115(2) toward the second side in the axial direction in accordance with the movement of the radial-direction pressing bodies 430 in radially outward directions.

In this embodiment, the pressing force toward the first side in the axial direction exerted on the first inner ring member 115(1) by the preloading means 400 is transmitted via the first rolling elements 150(1) to the first outer ring member 135(1), the movement of which toward the first side in the axial direction is prevented by the first stopper 370(1), as a force that presses the first outer ring member 135(1) toward the first side in the axial direction, and, accordingly, a preload necessary for power transmission via the first inner ring member 115(1) is produced.

That is, the first inner ring member 115(1) pressed toward the first side in the axial direction by the preloading means 400 has an outer circumferential surface engaged with the first rolling elements 150(1), and the outer circumferential surface has an angular race facing the first side in the axial direction and outward in the radial direction. On the other hand, the first outer ring member 135(1), the movement of which toward the first side in the axial direction is prevented by the first stopper 370(1), has an inner circumferential surface engaged with the first rolling elements 150(1), and the inner circumferential surface has an angular race facing the second side in the axial direction and inward in the radial direction. Accordingly, the preload is produced by the pressing force toward the first side in the axial direction exerted on the first inner ring member 115(1) by the preloading means 400.

Likewise, the pressing force toward the second side in the axial direction exerted on the second inner ring member 115(2) by the preloading means 400 is transmitted via the second rolling elements 150(2) to the second outer ring member 135(2), the movement of which toward the second side in the axial direction is prevented by the second stopper 370(2), as a force that presses the second outer ring member 135(2) toward the second side in the axial direction, and, accordingly, a preload necessary for power transmission via the second inner ring member 115(1) is produced.

That is, the second inner ring member 115(2) pressed toward the second side in the axial direction by the preloading means 400 has an outer circumferential surface engaged with the second rolling elements 150(2), and the outer circumferential surface has an angular race facing the second side in the axial direction and outward in the radial direction. On the other hand, the second outer ring member 135(2), the movement of which toward the second side in the axial direction is prevented by the second stopper 370(2), has an inner circumferential surface engaged with the second rolling elements 150(2), and the inner circumferential surface has an angular race facing the first side in the axial direction and inward in the radial direction. Accordingly, the preload is produced by the pressing force toward the first side in the axial direction exerted on the second inner ring member 115(2) by the preloading means 400.

In this embodiment, the preload can be adjusted in a stepless manner in accordance with the amount of insertion of the axial-direction pressing body 410.

The power-transmitting mechanism with rolling-element bearing 100E according to this embodiment can also provide the same effect as the power-transmitting mechanisms with rolling-element bearing 100A to 100D according to the first to fourth embodiments.

Sixth Embodiment

Below, yet another embodiment of the power-transmitting mechanism with rolling-element bearing of the present invention will now be described with reference to the appended drawings.

Figure 8:
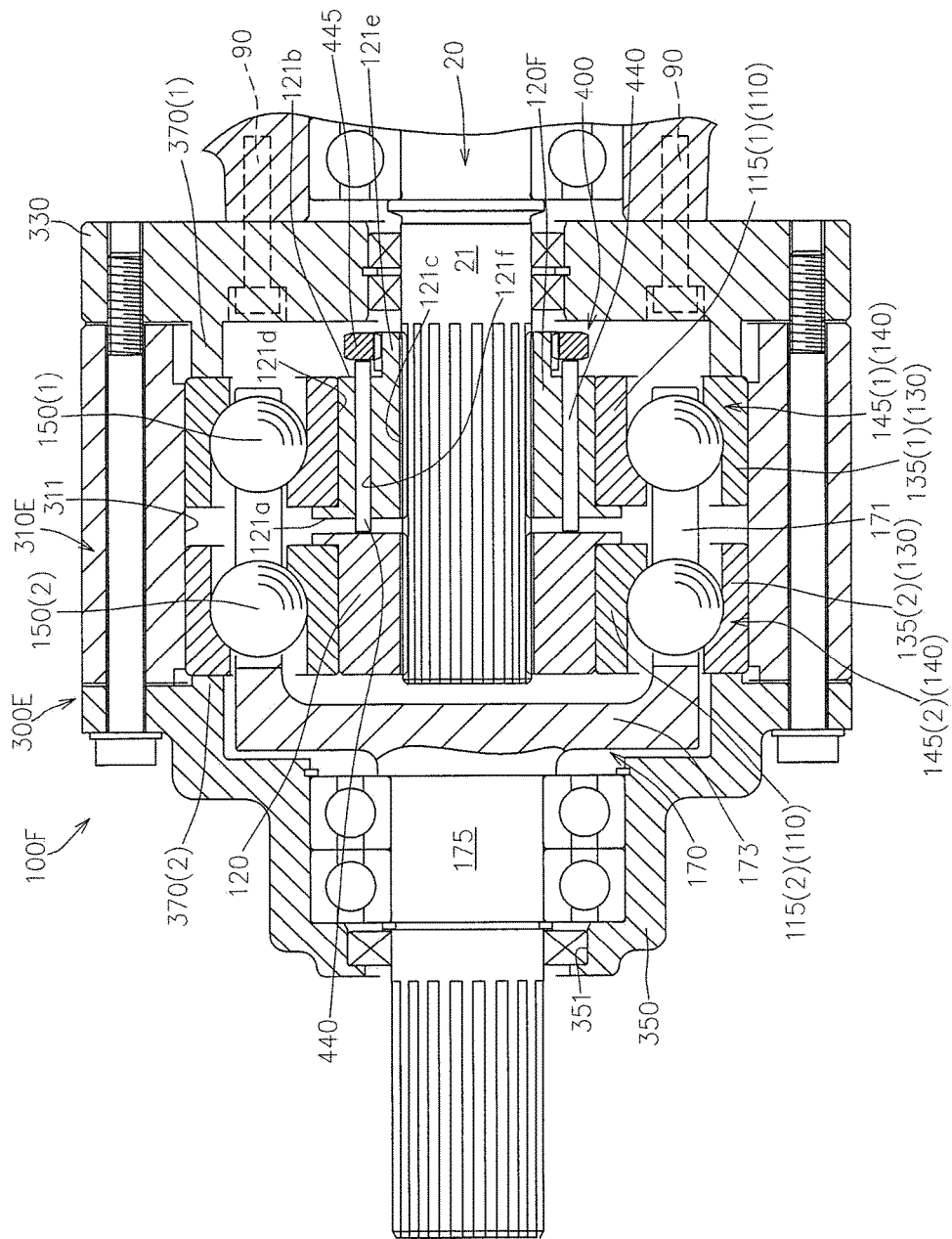
FIG. 8 is a cross-sectional view of a power-transmitting mechanism with rolling-element bearing according to a sixth embodiment of the present invention.

FIG. 8 shows a cross-sectional view of a power-transmitting mechanism with rolling-element bearing 100F according to this embodiment.

In the drawings, substantially the same components as those in the first to fifth embodiments are given the same reference numbers, and descriptions thereof are omitted as appropriate.

The power-transmitting mechanism with rolling-element bearing 100F according to this embodiment is different from the power-transmitting mechanism with rolling-element bearing 100E according to the fifth embodiment with respect to the specific configuration of the preloading means 400.

Specifically, in comparison to the power-transmitting mechanism with rolling-element bearing 100E according to the fifth embodiment, the power-transmitting mechanism with rolling-element bearing 100F has an inner collar member 120F in place of one of the inner collar members 120 firmly attached to the first and second inner ring members 115(1), 115(2).

In this embodiment, in comparison to the power-transmitting mechanism with rolling-element bearing 100E according to the fifth embodiment, the inner collar member 120F is provided in place of the inner collar member 120 firmly attached to the first inner ring member 115(1).

The inner collar member 120F has a counter end face 121a facing the other inner collar member (the inner collar member 120 firmly attached to the second inner ring member 115(2) in this embodiment), an opposite end face 121b facing away from the other inner collar member in the axial direction, an inner circumferential surface 121c spline-connected to the pump shaft 20, an outer circumferential surface 121d engaged with the corresponding inner ring member (the first inner ring member 115(1) in this embodiment), an extending part 121e extending from a radially intermediate portion of the opposite end face 121b toward the side far from the other inner collar member in the axial direction and having male threads on the outer circumferential surface, and a through-hole 121f penetrating the inner collar member 120F in the axial direction so as to be open to the counter end face 121a and the opposite end face 121b at a position more outward in the radial direction than the extending part 121e is.

As shown in FIG. 8, a pressing body 440 is inserted into the through-hole 121f such that the distal end is engaged with the end face of the other inner collar member 120.

Moreover, a nut 445 is screw-fitted to the male threads of the extending part 121e so as to be engaged with the proximal end of the pressing body 440.

In this configuration, the pressing body 440, the nut 445, and the male threads of the extending part 121e form the preloading means 400.

That is, as the nut 445 is screwed over the male threads, the pressing body 440 presses the other inner collar member 120 (the inner collar member 120 firmly attached to the second inner ring member 115(2)) toward the second side in the axial direction and, also, receives a reaction force from the other inner collar member 120 toward the first side in the axial direction.

Due to this reaction force, a pressing force toward the first side in the axial direction is exerted on the inner collar member 120F firmly attached to the first inner ring member 115(1).

The first inner ring member 115(1) pressed toward the first side in the axial direction by the preloading means 400 has an outer circumferential surface engaged with the first rolling elements 150(1), and the outer circumferential surface has an angular race facing the first side in the axial direction and outward in the radial direction. On the other hand, the first outer ring member 135(1), the movement of which toward the first side in the axial direction is prevented by the first stopper 370(1), has an inner circumferential surface engaged with the first rolling elements 150(1), and the inner circumferential surface has an angular race facing the second side in the axial direction and inward in the radial direction. Accordingly, a preload necessary for power transmission via the first inner ring member 115(1) is produced by the pressing force toward the first side in the axial direction exerted on the first inner ring member 115(1) by the preloading means 400.

On the other hand, a pressing force toward the second side in the axial direction is exerted on the other inner collar member 120 from the pressing body 440 in accordance with the nut 445 being screwed over the male threads.

The second inner ring member 115(2) pressed toward the second side in the axial direction by the preloading means 400 has an outer circumferential surface engaged with the second rolling elements 150(2), and the outer circumferential surface has an angular race facing the second side in the axial direction and outward in the radial direction. On the other hand, the second outer ring member 135(2), the movement of which toward the second side in the axial direction is prevented by the second stopper 370(2), has an inner circumferential surface engaged with the second rolling elements 150(2), and the inner circumferential surface has an angular race facing the first side in the axial direction and inward in the radial direction. Accordingly, a preload necessary for power transmission via the second inner ring member 115(2) is produced by the pressing force toward the second side in the axial direction exerted on the second inner ring member 115(2) by the preloading means 400.

Preferably, a plurality of pressing bodies 440 are disposed at equal intervals in the circumferential direction in reference to the axis of the pump shaft 20.

That is, for example, two pressing bodies 440 can be provided at intervals of 180 degrees around the axis of the pump shaft 20.

The power-transmitting mechanism with rolling-element bearing 100F according to this embodiment can also provide the same effect as the power-transmitting mechanisms with rolling-element bearing 100A to 100E according to the first to fifth embodiments.

Seventh Embodiment

Below, yet another embodiment of the power-transmitting mechanism with rolling-element bearing of the present invention will now be described with reference to the appended drawings.

Figure 9:
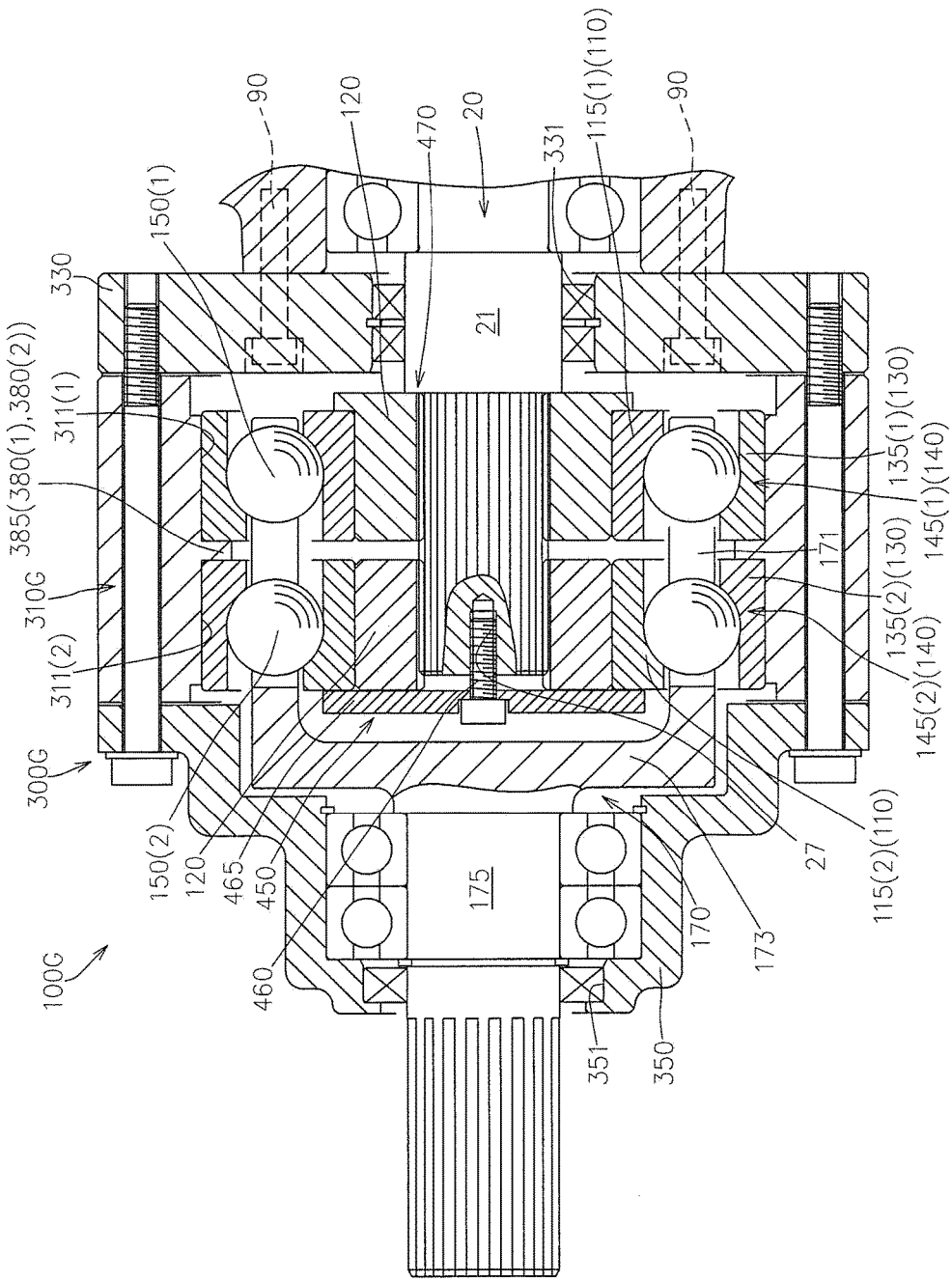
FIG. 9 is a cross-sectional view of a power-transmitting mechanism with rolling-element bearing according to a seventh embodiment of the present invention.

FIG. 9 shows a cross-sectional view of a power-transmitting mechanism with rolling-element bearing 100G according to this embodiment.

In the drawings, substantially the same components as those in the first to sixth embodiments are given the same reference numbers, and descriptions thereof are omitted as appropriate.

The power-transmitting mechanism with rolling-element bearing 100G according to this embodiment is different from the power-transmitting mechanisms with rolling-element bearing 100E, 100F according to the fifth and sixth embodiments mainly in that a preloading means 450 that presses the first and second inner ring members 115(1), 115(2) in mutually approaching directions is provided in place of the preloading means 400 that presses the first and second inner ring members 115(1), 115(2) in mutually opposite directions.

Specifically, in comparison to the power-transmitting mechanism with rolling-element bearing 100E according to the fifth embodiment, the power-transmitting mechanism with rolling-element bearing 100G has a power-transmitting case 300G in place of the power-transmitting case 300E and has a preloading means 450 in place of the preloading means 400.

As shown in FIG. 9, the power-transmitting case 300G has a peripheral wall 310G having an engagement surface 311 directly or indirectly engaged with the outer circumferential surfaces of the first and second outer ring members 135(1), 135(2), a first end wall 330 blocking the first side in the axial direction of the peripheral wall 310G and having an axial hole 331 into which the pump shaft 20 is inserted, a second end wall 350 blocking the second side in the axial direction of the peripheral wall 310G and having an access opening 351 for access to the retainer 170, a first stopper 380(1) engaged with the end face on the second side in the axial direction of the first outer ring member 135(1) to prevent the movement of the first outer ring member 135(1) toward the second side in the axial direction, and a second stopper 380(2) engaged with the end face on the first side in the axial direction of the second outer ring member 135(2) to prevent the movement of the second outer ring member 135(2) toward the first side in the axial direction.

As shown in FIG. 9, in this embodiment, the peripheral wall 310G has a projection 385 extending from the engagement surface 311 inward in the radial direction so as to partition the engagement surface 311 into a first engagement surface 311(1) on the first outer ring member side and a second engagement surface 311(2) on the second outer ring member side, and the end faces on the first side and the second side in the axial direction of the projection 380 act as first and second stoppers 380(1), 380(2), respectively.

As shown in FIG. 9, the pump shaft 20 has a screw hole 27 extending in the axial direction such that one end of which is open to the end face.

As shown in FIG. 9, the preloading means 450 has a screw member 460 screwed into the screw hole 270, a pressing body 465 including a proximal end engaged with the screw member 460 and a distal end extending in the radially outward direction from the proximal end and directly or indirectly engaged with the second side in the axial direction of the second inner ring member 115(2), and an engagement part 470 provided on the pump shaft 20 so as to be directly or indirectly engaged with the end face on the first side in the axial direction of the first inner ring member 115(1).

In the preloading means 450, as the screw member 460 is screwed into the screw hole 27, the pressing body 465 and the engagement surface 470 are pressed in mutually approaching directions, and, accordingly, a pressing force is exerted on the first and second inner ring members 115(1), 115(2) in mutually approaching directions with respect to the axial direction.

A preload necessary for power transmission via the first inner ring member 115(1) is produced by the preloading means 450.

That is, the first inner ring member 115(1) pressed toward the second side in the axial direction by the preloading means 450 has an outer circumferential surface engaged with the first rolling elements 150(1), and the outer circumferential surface has an angular race facing the second side in the axial direction and outward in the radial direction. On the other hand, the first outer ring member 135(1), the movement of which toward the second side in the axial direction is prevented by the first stopper 380(1), has an inner circumferential surface engaged with the first rolling elements 150(1), and the inner circumferential surface has an angular race facing the first side in the axial direction and inward in the radial direction. Accordingly, the preload is produced by the pressing force toward the second side in the axial direction exerted on the first inner ring member 115(1) by the preloading means 450.

Likewise, a preload necessary for power transmission via the second inner ring member 115(2) is produced by the preloading means 450.

That is, the second inner ring member 115(2) pressed toward the first side in the axial direction by the preloading means 450 has an outer circumferential surface engaged with the second rolling elements 150(2), and the outer circumferential surface has an angular race that face the first side in the axial direction and outward in the radial direction. On the other hand, the second outer ring member 135(2), the movement of which toward the first side in the axial direction is prevented by the second stopper 380(2), has an inner circumferential surface engaged with the second rolling elements 150(2), and the inner circumferential surface has an angular race facing the second side in the axial direction and inward in the radial direction. Accordingly, the preload is produced by the pressing force toward the first side in the axial direction exerted on the second inner ring member 115(2) by the preloading means 450.

The power-transmitting mechanism with rolling-element bearing 100G according to this embodiment can also provide the same effect as the power-transmitting mechanisms with rolling-element bearing 100A to 100F according to the first to sixth embodiments.

In this embodiment, due to the pressing force by the preloading means 450, the first and second outer ring members 135(1), 135(2) are respectively pressed against the first and second stoppers 380(1), 380(2) provided on the peripheral wall 310G that is a fixed member.

Accordingly, unintentional rotation of the first outer ring member 135(1) is effectively prevented by frictional force between the first outer ring member 135(1) and the first stopper 380(1), and unintentional rotation of the second outer ring member 135(2) is effectively prevented by frictional force between the second outer ring member 135(2) and the second stopper 380(2).

Eighth Embodiment

Below, yet another embodiment of the power-transmitting mechanism with rolling-element bearing of the present invention will now be described with reference to the appended drawings.

Figure 10:
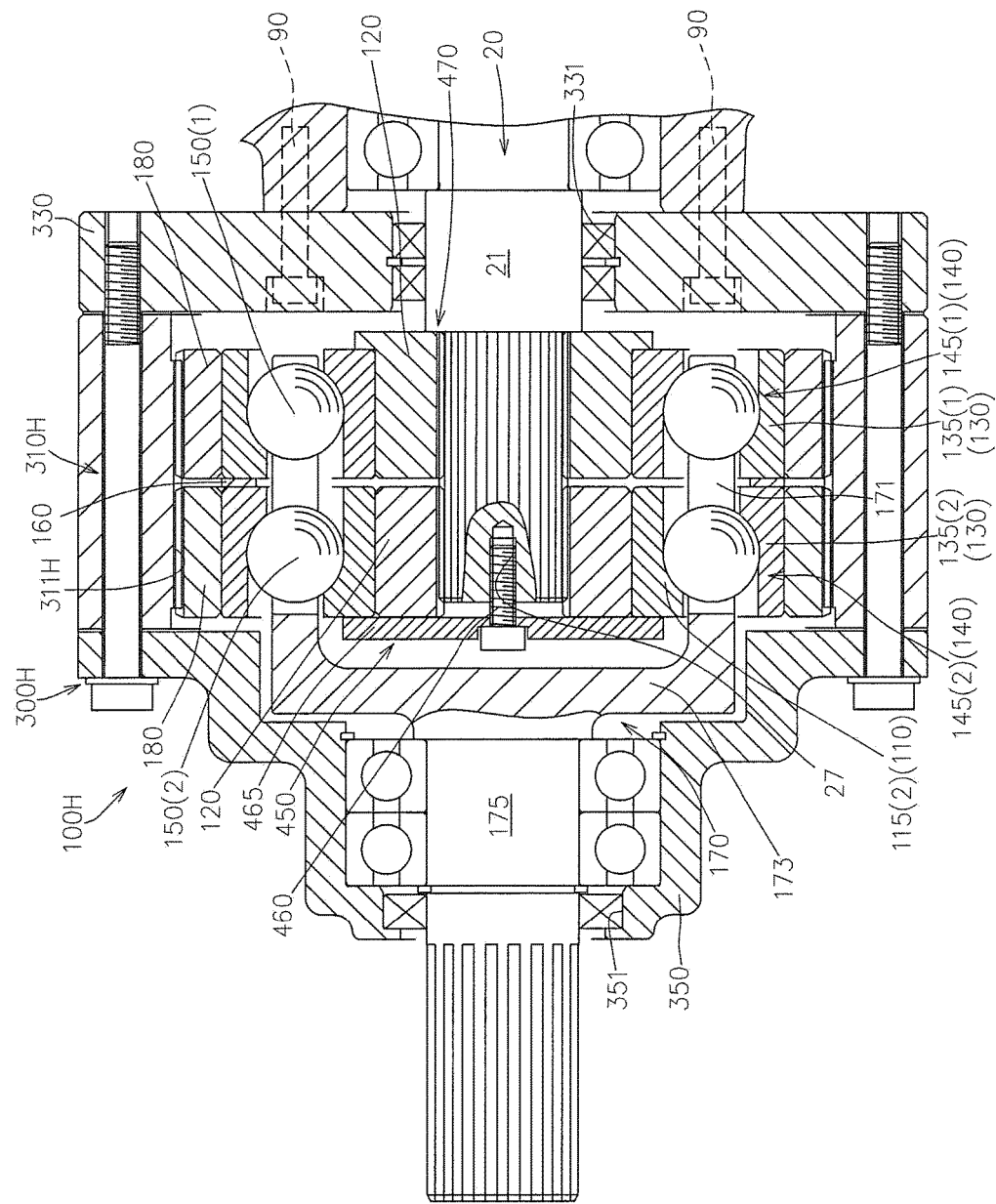
FIG. 10 is a cross-sectional view of a power-transmitting mechanism with rolling-element bearing according to an eighth embodiment of the present invention.

FIG. 10 shows a cross-sectional view of a power-transmitting mechanism with rolling-element bearing 100H according to this embodiment.

In the drawings, substantially the same components as those in the first to seventh embodiments are given the same reference numbers, and descriptions thereof are omitted as appropriate.

In the power-transmitting mechanism with rolling-element bearing 100G according to the seventh embodiment, the first and second outer ring members 135(1), 135(2) are respectively engaged with the first and second stoppers 380(1), 380(2) provided on the peripheral wall 310G, which is a fixed member, and thereby their axial-direction movement is prevented.

On the other hand, the power-transmitting mechanism with rolling-element bearing 100H according to this embodiment is configured such that the first and second outer ring members 135(1), 135(2) are directly or indirectly engaged with each other so that the axial-direction movement of the first and second outer ring members 135(1), 135(2) is prevented.

Specifically, in comparison to the power-transmitting mechanism with rolling-element bearing 100G according to the seventh embodiment, the power-transmitting mechanism with rolling-element bearing 100H has a power-transmitting case 300H in place of the power-transmitting case 300G.

As shown in FIG. 10, the power-transmitting case 300H has a peripheral wall 310H having an engagement surface 311H directly or indirectly engaged with the outer circumferential surfaces of the first and second outer ring members 135(1), 135(2) so as to allow axial-direction movement of, and prevent the rotation around the axis of, the first and second outer ring members 135(1), 135(2), a first end wall 330 blocking the first side in the axial direction of the peripheral wall 310H and having an axial hole 331 into which the pump shaft 20 is inserted, and a second end wall 350 blocking the second side in the axial direction of the peripheral wall 310H and having an access opening 351 for access to the retainer 170.

In this embodiment, as shown in FIG. 10, the engagement surface 311H is formed with a spline.

On the other hand, ring-shaped outer collar members 180 are respectively disposed around the first and second outer ring members 135(1), 135(2) by press-fitting, shrink-fitting, expansion-fitting, or the like so as to be incapable of relative rotation and incapable of relative axial-direction movement.

The outer circumferential surfaces of the outer collar members 180 have splines that are connected to the splines of the engagement surface 311H. The outer collar members 180 are spline-connected to the engagement surface 311H and, thereby, the first and second outer ring members 135(1), 135(2) are made movable in the axial direction and made non rotatable.

In this embodiment, as shown in FIG. 10, the first and second outer ring members 135(1), 135(2) are pressed against each other, and their axial-direction movement is thus prevented.

In the depicted embodiment, the first and second outer ring members 135(1), 135(2) are disposed so as to be in contact with each other via a spacer.

In the power-transmitting mechanism with rolling-element bearing 100H having the above-described configuration, a pressing force toward the second side in the axial direction exerted on the first inner ring member 115(1) by the preloading means 450 is transmitted to the first outer ring member 135(1) via the first rolling elements 150(1) as a force that presses the first outer ring member 135(1) toward the second side in the axial direction.

That is, the first inner ring member 115(1) pressed toward the second side in the axial direction by the preloading means 450 has an outer circumferential surface engaged with the first rolling elements 150(1), and the outer circumferential surface has an angular race facing the second side in the axial direction and outward in the radial direction. On the other hand, the first outer ring member 135(1) has an inner circumferential surface engaged with the first rolling elements 150(1), and the inner circumferential surface has an angular race facing the first side in the axial direction and inward in the radial direction. Accordingly, a pressing force toward the second side in the axial direction exerted on the first inner ring member 115(1) by the preloading means 450 is transmitted to the first outer ring member 135(1) via the first rolling elements 150(1) as a force that presses the first outer ring member 135(1) toward the second side in the axial direction.

On the other hand, a pressing force toward the first side in the axial direction exerted on the second inner ring member 115(2) by the preloading means 450 is transmitted to the second outer ring member 135(2) via the second rolling elements 150(2) as a force that presses the second outer ring member 135(2) toward the first side in the axial direction.

That is, the second inner ring member 115(2) pressed toward the first side in the axial direction by the preloading means 450 has an outer circumferential surface engaged with the second rolling elements 150(2), and the outer circumferential surface has an angular race facing the first side in the axial direction and outward in the radial direction. On the other hand, the second outer ring member 135(2) has an inner circumferential surface engaged with the second rolling elements 150(2), and the inner circumferential surface has an angular race facing the second side in the axial direction and inward in the radial direction. Accordingly, a pressing force toward the first side in the axial direction exerted on the second inner ring member 115(2) by the preloading means 450 is transmitted to the second outer ring member 135(2) via the second rolling elements 150(2) as a force that presses the second outer ring member 135(2) toward the first side in the axial direction.

Here, as described above, the first and second outer ring members 135(1), 135(2) are disposed so as to be in contact with each other, thus the axial-direction movement of the first and second outer ring members 135(1), 135(2) is prevented, and, accordingly, a preload necessary for power transmission is produced in the power-transmitting mechanism with rolling-element bearing 100H.

The rotation of the first and second outer ring members 135(1), 135(2) around the axis is securely prevented by the outer collar member 180 and the engagement surface 311H of the peripheral wall 310H that are spline-connected.

The power-transmitting with rolling-element bearing mechanism 100H according to this embodiment can also provide the same effect as the power-transmitting mechanisms with rolling-element bearing 100A to 100G according to the first to seventh embodiments.

Although the above-described embodiments have been described in reference to cases where the power-transmitting mechanism with rolling-element bearing according to the present invention is used as an accelerating power-transmitting mechanism, naturally the power-transmitting mechanism with rolling-element bearing can be used as a decelerating power-transmitting mechanism.

In this case, rotary power is input into the inner ring 110, then the rotary power input into the inner ring 110 is decelerated, and the decelerated rotary power is output from the retainer 170.

What is claimed is:

1. A power-transmitting mechanism with rolling-element bearing, comprising:
    an inner ring directly or indirectly supported by a rotational shaft so as to be incapable of relative rotation;
    an outer ring surrounding the inner ring such that there is a gap between the outer ring and the inner ring;
    a plurality of rolling elements held by the inner ring and the outer ring therebetween;
    a retainer that retains the plurality of rolling elements at predetermined intervals in a circumferential direction and rotates around the same axis as the rotational shaft in conjunction with orbital rotation of the plurality of rolling elements; and
    a preloading means exerting a pressing force in an axial direction on one of the inner ring and the outer ring to exert a preload between the inner ring and the outer ring,
    wherein the inner ring has a plurality of inner ring members including first and second inner ring members that are disposed in series in the axial direction;
    the outer ring has a plurality of outer ring members including first and second outer ring members that respectively cooperate with the first and second inner ring members;
    the plurality of rolling elements include first and second rolling elements, the first rolling elements being disposed in the circumferential direction between the first inner ring member and the first outer ring member, the second rolling elements being disposed in the circumferential direction between the second inner ring member and the second outer ring member; and
    the retainer has:
        a plurality of partitions retaining the plurality of rolling elements at predetermined intervals in the circumferential direction such that the first and second rolling elements orbit the corresponding first and second inner ring members in a synchronized manner while the first and second rolling elements being freely rotatable around the respective centers in an independent manner with respect to one another, and
        a connector connecting the plurality of partitions such that the plurality of partitions integrally rotate around an axis.

2. The power-transmitting mechanism with rolling-element bearing according to claim 1, wherein the one pair of cooperating inner and outer ring members and the rolling elements disposed therebetween have the same configurations as the other pair of cooperating inner and outer ring members and the rolling elements disposed therebetween.

3. The power-transmitting mechanism with rolling-element bearing according to claim 1, further comprising a power-transmitting case accommodating the plurality of inner ring members, the plurality of rolling elements, the plurality of outer ring members, and the retainer, so as to allow access to the plurality of inner ring members and the retainer from outside.

4. The power-transmitting mechanism with rolling-element bearing according to claim 2, further comprising a power-transmitting case accommodating the plurality of inner ring members, the plurality of rolling elements, the plurality of outer ring members, and the retainer, so as to allow access to the plurality of inner ring members and the retainer from outside.

5. The power-transmitting mechanism with rolling-element bearing according to claim 3, wherein
    the inner ring has first and second inner ring members disposed in series in order of a first side, which is one side in the axial direction, to a second side, which is opposite to the first side in the axial direction, as the plurality of inner ring members;
    the outer ring has first and second outer ring members respectively cooperating with the first and second inner ring members as the plurality of outer ring members;
    the power-transmitting case has a stopper engaged with an end face on the first side in the axial direction of the first outer ring member to prevent movement of the first outer ring member toward the first side in the axial direction;
    the preloading means presses the second outer ring toward the first side in the axial direction; and the second outer ring member, the second inner ring member, the first inner ring member, and the first outer ring member are configured such that a pressing force exerted on the second outer ring member by the preloading means is transmitted to the second inner ring member via the corresponding rolling elements as a force that presses the second inner ring member toward the first side in the axial direction, and the pressing force toward the first side in the axial direction transmitted to the second inner ring member is transmitted to the first outer ring member via the first inner ring member and the corresponding rolling elements as a force that presses the first outer ring member toward the first side in the axial direction.

6. The power-transmitting mechanism with rolling-element bearing according to claim 4, wherein
the inner ring has first and second inner ring members disposed in series in order of a first side, which is one side in the axial direction, to a second side, which is opposite to the first side in the axial direction, as the plurality of inner ring members;
the outer ring has first and second outer ring members respectively cooperating with the first and second inner ring members as the plurality of outer ring members;
the power-transmitting case has a stopper engaged with an end face on the first side in the axial direction of the first outer ring member to prevent movement of the first outer ring member toward the first side in the axial direction;
the preloading means presses the second outer ring toward the first side in the axial direction; and
the second outer ring member, the second inner ring member, the first inner ring member, and the first outer ring member are configured such that a pressing force exerted on the second outer ring member by the preloading means is transmitted to the second inner ring member via the corresponding rolling elements as a force that presses the second inner ring member toward the first side in the axial direction, and the pressing force toward the first side in the axial direction transmitted to the second inner ring member is transmitted to the first outer ring member via the first inner ring member and the corresponding rolling elements as a force that presses the first outer ring member toward the first side in the axial direction.

7. The power-transmitting mechanism with rolling-element bearing according to claim 5, wherein
the power-transmitting case has a peripheral wall, a first end wall blocking the first side in the axial direction of the peripheral wall and having an axial hole into which the rotational shaft is inserted, and a second end wall blocking the second side in the axial direction of the peripheral wall and having an access opening for access to the retainer;
the peripheral wall has:
an engagement surface directly or indirectly engaged with outer circumferential surfaces of the first and second outer ring members so as to allow axial-direction movement of at least the second outer ring member, and terminating at a position more toward the first side in the axial direction than the second end wall is, and
an attachment surface extending from an end on the second side in the axial direction of the engagement surface in a radially outward direction with reference to an axis of the rotational shaft, and facing the second side in the axial direction; and the preloading means has a screw member inserted into a screw hole open to the attachment surface, and a pressing body directly or indirectly engaged with the second side in the axial direction of the second outer ring member and fixed to the peripheral wall by the screw member.

8. The power-transmitting mechanism with rolling-element bearing according to claim 6, wherein
the power-transmitting case has a peripheral wall, a first end wall blocking the first side in the axial direction of the peripheral wall and having an axial hole into which the rotational shaft is inserted, and a second end wall blocking the second side in the axial direction of the peripheral wall and having an access opening for access to the retainer;
the peripheral wall has:
an engagement surface directly or indirectly engaged with outer circumferential surfaces of the first and second outer ring members so as to allow axial-direction movement of at least the second outer ring member, and terminating at a position more toward the first side in the axial direction than the second end wall is, and
an attachment surface extending from an end on the second side in the axial direction of the engagement surface in a radially outward direction with reference to an axis of the rotational shaft, and facing the second side in the axial direction; and
the preloading means has a screw member inserted into a screw hole open to the attachment surface, and a pressing body directly or indirectly engaged with the second side in the axial direction of the second outer ring member and fixed to the peripheral wall by the screw member.

9. The power-transmitting mechanism with rolling-element bearing according to claim 5, wherein
the power-transmitting case has:
a peripheral wall,
a first end wall blocking the first side in the axial direction of the peripheral wall and having an axial hole into which the rotational shaft is inserted, and
a second end wall removably attached to the peripheral wall so as to block an opening on the second side in the axial direction of the peripheral wall, wherein the opening enables the first and second outer ring members to be inserted, and the second end wall has an access opening for access to the retainer;
the peripheral wall has an engagement surface directly or indirectly engaged with outer circumferential surfaces of the first and second outer ring members so as to allow axial-direction movement of at least the second outer ring member, and terminating at a position more toward the first side in the axial direction than the opening on the second side in the axial direction of the peripheral wall is;
the second end wall is removably connected to the peripheral wall such that an outer circumferential surface of the second end wall is engaged with an inner circumferential surface of the peripheral wall on more toward the second side in the axial direction than the engagement surface is; and
the preloading means has a pressing body that is provided in the second end wall so as to be directly or indirectly engaged with the second side in the axial direction of the second outer ring member.

10. The power-transmitting mechanism with rolling-element bearing according to claim 6, wherein the power-transmitting case has:
a peripheral wall,
a first end wall blocking the first side in the axial direction of the peripheral wall and having an axial hole into which the rotational shaft is inserted, and
a second end wall removably attached to the peripheral wall so as to block an opening on the second side in the axial direction of the peripheral wall, wherein the opening enables the first and second outer ring members to be inserted, and the second end wall has an access opening for access to the retainer;
the peripheral wall has an engagement surface directly or indirectly engaged with outer circumferential surfaces of the first and second outer ring members so as to allow axial-direction movement of at least the second outer ring member, and terminating at a position more toward the first side in the axial direction than the opening on the second side in the axial direction of the peripheral wall is;
the second end wall is removably connected to the peripheral wall such that an outer circumferential surface of the second end wall is engaged with an inner circumferential surface of the peripheral wall on more toward the second side in the axial direction than the engagement surface is; and
the preloading means has a pressing body that is provided in the second end wall so as to be directly or indirectly engaged with the second side in the axial direction of the second outer ring member.

11. The power-transmitting mechanism with rolling-element bearing according to claim 5, wherein
the power-transmitting case has a peripheral wall, a first end wall blocking the first side in the axial direction of the peripheral wall and having an axial hole into which the rotational shaft is inserted, and a second end wall blocking the second side in the axial direction of the peripheral wall and having an access opening for access to the retainer;
the peripheral wall has an engagement surface directly or indirectly engaged with outer circumferential surfaces of the first and second outer ring members so as to allow axial-direction movement of at least the second outer ring member, and
the preloading means has a pressing body penetrating the second end wall such that the distal end is directly or indirectly engaged with the second side in the axial direction of the second outer ring member, and the fixed position of the pressing body in the axial direction is adjustable.

12. The power-transmitting mechanism with rolling-element bearing according to claim 6, wherein
the power-transmitting case has a peripheral wall, a first end wall blocking the first side in the axial direction of the peripheral wall and having an axial hole into which the rotational shaft is inserted, and a second end wall blocking the second side in the axial direction of the peripheral wall and having an access opening for access to the retainer;
the peripheral wall has an engagement surface directly or indirectly engaged with outer circumferential surfaces of the first and second outer ring members so as to allow axial-direction movement of at least the second outer ring member, and
the preloading means has a pressing body penetrating the second end wall such that the distal end is directly or indirectly engaged with the second side in the axial direction of the second outer ring member, and the fixed position of the pressing body in the axial direction is adjustable.

13. The power-transmitting mechanism with rolling-element bearing according to claim 3, wherein
the inner ring has first and second inner ring members disposed in series in order of a first side, which is one side in the axial direction, to a second side, which is opposite to the first side in the axial direction, as the plurality of inner ring members;
the outer ring has first and second outer ring members respectively cooperating with the first and second inner ring members as the plurality of outer ring members;
the rotational shaft is provided with a first stopper directly or indirectly engaged with the end face on the first side in the axial direction of the first inner ring member to prevent the movement of the first inner ring member toward the first side in the axial direction, and a second stopper directly or indirectly engaged with the end face on the second side in the axial direction of the second inner ring member to prevent the movement of the second inner ring member toward the second side in the axial direction;
the power-transmitting case has a peripheral wall having an engagement surface directly or indirectly engaged with the outer circumferential surfaces of the first and second outer ring members so as to allow axial-direction movement of the first and second outer ring members, a first end wall blocking the first side in the axial direction of the peripheral wall and having an axial hole into which the pump shaft is inserted, and a second end wall blocking the second side in the axial direction of the peripheral wall and having an access opening for access to the retainer;
the preloading means has at least two pressing bodies provided to penetrate the peripheral wall such that the distal ends face a position between the first and second outer ring members, and the fixed positions of the pressing bodies in the radial direction in reference to the axis of the rotational shaft are adjustable; and
the distal ends of the pressing bodies, and/or the second side in the axial direction of the first outer ring member and the first side in the axial direction of the second outer ring member, have a cam surface that presses the first outer ring member toward the first side in the axial direction and the second outer ring member toward the second side in the axial direction in accordance with the movement of the pressing bodies in the radially inward direction.

14. The power-transmitting mechanism with rolling-element bearing according to claim 4, wherein
the inner ring has first and second inner ring members disposed in series in order of a first side, which is one side in the axial direction, to a second side, which is opposite to the first side in the axial direction, as the plurality of inner ring members;
the outer ring has first and second outer ring members respectively cooperating with the first and second inner ring members as the plurality of outer ring members;
the rotational shaft is provided with a first stopper directly or indirectly engaged with the end face on the first side in the axial direction of the first inner ring member to prevent the movement of the first inner ring member toward the first side in the axial direction, and a second stopper directly or indirectly engaged with the end face on the second side in the axial direction of the second inner ring member to prevent the movement of the second inner ring member toward the second side in the axial direction;

the power-transmitting case has a peripheral wall having an engagement surface directly or indirectly engaged with the outer circumferential surfaces of the first and second outer ring members so as to allow axial-direction movement of the first and second outer ring members, a first end wall blocking the first side in the axial direction of the peripheral wall and having an axial hole into which the pump shaft is inserted, and a second end wall blocking the second side in the axial direction of the peripheral wall and having an access opening for access to the retainer;

the preloading means has at least two pressing bodies provided to penetrate the peripheral wall such that the distal ends face a position between the first and second outer ring members, and the fixed positions of the pressing bodies in the radial direction in reference to the axis of the rotational shaft are adjustable; and the distal ends of the pressing bodies, and/or the second side in the axial direction of the first outer ring member and the first side in the axial direction of the second outer ring member, have a cam surface that presses the first outer ring member toward the first side in the axial direction and the second outer ring member toward the second side in the axial direction in accordance with the movement of the pressing bodies in the radially inward direction.

15. The power-transmitting mechanism with rolling-element bearing according to claim 3, wherein the inner ring has first and second inner ring members disposed in series in order of a first side, which is one side in the axial direction, to a second side, which is opposite to the first side in the axial direction, as the plurality of inner ring members;

the outer ring has first and second outer ring members respectively cooperating with the first and second inner ring members as the plurality of outer ring members;

the power-transmitting case has a peripheral wall having an engagement surface directly or indirectly engaged with the outer circumferential surfaces of the first and second outer ring members, a first end wall blocking the first side in the axial direction of the peripheral wall and having an axial hole into which the rotational shaft is inserted, a second end wall blocking the second side in the axial direction of the peripheral wall and having an access opening for access to the retainer, a first stopper engaged with the end face on the first side in the axial direction of the first outer ring member to prevent the movement of the first outer ring member toward the first side in the axial direction, and a second stopper engaged with the end face on the second side in the axial direction of the second outer ring member to prevent the movement of the second outer ring member toward the second side in the axial direction;

the preloading means has an axial-direction pressing body provided in the rotational shaft such that the fixed position of the axial-direction pressing body in the axial direction is adjustable, and at least two radial-direction pressing bodies provided in the rotational shaft so as to be movable in a radial direction in reference to the axis of the rotational shaft in a state where the inner ends of the radial-direction pressing bodies each are engaged with the distal end of the axial-direction pressing body and outer the distal ends of the radial-direction pressing bodies each face a position between the first and second inner ring members;

the distal end of the axial-direction pressing body and/or the inner end of the radial direction pressing body have a cam surface pressing the radial-direction pressing bodies in radially outward directions in accordance with the movement of the axial-direction pressing body toward the first side in the axial direction; and the distal end of the radial-direction pressing body and/or the second side in the axial direction of the first inner ring member and the first side in the axial direction of the second inner ring member have a cam surface pressing the first inner ring member toward the first side in the axial direction and the second inner ring member toward the second side in the axial direction in accordance with the movement of the radial-direction pressing bodies in radially outward direction.

16. The power-transmitting mechanism with rolling-element bearing according to claim 3, wherein the inner ring has first and second inner ring members disposed in series in order of a first side, which is one side in the axial direction, to a second side, which is opposite to the first side in the axial direction, as the plurality of inner ring members;

the outer ring has first and second outer ring members respectively cooperating with the first and second inner ring members as the plurality of outer ring members;

the power-transmitting case has a peripheral wall having an engagement surface directly or indirectly engaged with the outer circumferential surfaces of the first and second outer ring members, a first end wall blocking the first side in the axial direction of the peripheral wall and having an axial hole into which the rotational shaft is inserted, a second end wall blocking the second side in the axial direction of the peripheral wall and having an access opening for access to the retainer, a first stopper engaged with the end face on the first side in the axial direction of the first outer ring member to prevent the movement of the first outer ring member toward the first side in the axial direction, and a second stopper engaged with the end face on the second side in the axial direction of the second outer ring member to prevent the movement of the second outer ring member toward the second side in the axial direction; and the preloading means has a screw member screwed into a screw hole that is formed in the rotational axis so as to extend in the axial direction and is opened to an end face of the rotational shaft, a pressing body including a proximal end engaged with the screw member and a distal end extending in the radially outward direction from the proximal end and directly or indirectly engaged with the second side in the axial direction of the second inner ring member, and an engagement part provided on the rotational shaft so as to be directly or indirectly engaged with the end face on the first side in the axial direction of the first inner ring member.

17. The power-transmitting mechanism with rolling-element bearing according to claim 16, wherein the peripheral wall has a projection extending from the engagement surface inward in the radial direction so as to partition the engagement surface into a first engagement surface on the first outer ring member side and a second engagement surface on the second outer ring member side; and the end faces on the first side and the second side in the axial direction of the projection act as first and second stoppers, respectively.

18. The power-transmitting mechanism with rolling-element bearing according to claim 3, wherein the inner ring has first and second inner ring members disposed in series in order of a first side, which is one side in the axial direction, to a second side, which is opposite to the first side in the axial direction, as the plurality of inner ring members;

the outer ring has first and second outer ring members respectively cooperating with the first and second inner ring members as the plurality of outer ring members;

the power-transmitting case has a peripheral wall having an engagement surface directly or indirectly engaged with the outer circumferential surfaces of the first and second outer ring members so as to allow axial-direction movement of, and prevent the rotation around the axis of, the first and second outer ring members, a first end wall blocking the first side in the axial direction of the peripheral wall and having an axial hole into which the rotational shaft is inserted, and a second end wall blocking the second side in the axial direction of the peripheral wall and having an access opening for access to the retainer;

the preloading means has a screw member screwed into a screw hole that is formed in the rotational axis so as to extend in the axial direction and is opened to an end face of the rotational shaft, a pressing body including a proximal end engaged with the screw member and a distal end extending in the radially outward direction from the proximal end and directly or indirectly engaged with the second side in the axial direction of the second inner ring member, and an engagement part provided on the rotational shaft so as to be directly or indirectly engaged with the end face on the first side in the axial direction of the first inner ring member; and the first and second outer ring members are directly or indirectly engaged with each other so that the axial-direction movement of the first and second outer ring members is prevented.

19. The power-transmitting mechanism with rolling-element bearing according to claim 3, wherein the inner ring has first and second inner ring members disposed in series in order of a first side, which is one side in the axial direction, to a second side, which is opposite to the first side in the axial direction, as the plurality of inner ring members;

the outer ring has first and second outer ring members respectively cooperating with the first and second inner ring members as the plurality of outer ring members;

the power-transmitting case has a peripheral wall having an engagement surface directly or indirectly engaged with the outer circumferential surfaces of the first and second outer ring members, a first end wall blocking the first side in the axial direction of the peripheral wall and having an axial hole into which the rotational shaft is inserted, a second end wall blocking the second side in the axial direction of the peripheral wall and having an access opening for access to the retainer, a first stopper engaged with the end face on the first side in the axial direction of the first outer ring member to prevent the movement of the first outer ring member toward the first side in the axial direction, and a second stopper engaged with the end face on the second side in the axial direction of the second outer ring member to prevent the movement of the second outer ring member toward the second side in the axial direction;

one of the first and second inner ring members has an extending part extending toward an opposite direction to the other inner ring member in the axial direction from a radially intermediate portion of an opposite end face toward the side far from the other inner ring member in the axial direction and having male threads on the outer circumferential surface, and a through-hole extending in the axial direction from the opposite end face to a counter end face facing the other inner ring member at a position more outward in the radial direction than the extending part is; and the preloading means has a nut screw-fitted to the male threads, and a pressing body inserted into the through-hole so that a first end is engaged with an end face of the nut and a second end is engaged with an end face of the other inner ring member.

20. A power-transmitting mechanism with rolling-element bearing, comprising:

an inner ring directly or indirectly supported by a rotational shaft so as to be incapable of relative rotation;

an outer ring surrounding the inner ring such that there is a gap between the outer ring and the inner ring;

a plurality of rolling elements held by the inner ring and the outer ring therebetween;

a retainer that retains the plurality of rolling elements at predetermined intervals in a circumferential direction and rotates around the same axis as the rotational shaft in conjunction with orbital rotation of the plurality of rolling elements;

a power-transmitting case; and a preloading means exerting a pressing force in an axial direction on one of the inner ring and the outer ring to exert a preload between the inner ring and the outer ring, wherein the inner ring has a plurality of inner ring members disposed in series in the axial direction;

the outer ring has a plurality of outer ring members respectively cooperating with the plurality of inner ring members;

the plurality of rolling elements are disposed between the cooperating inner ring members and outer ring members; and the retainer has:
a plurality of partitions retaining the plurality of rolling elements at predetermined intervals in the circumferential direction such that rolling elements disposed between one pair of cooperating inner ring and outer ring members and rolling elements disposed between another pair of cooperating inner ring and outer ring members orbit the corresponding inner ring members in a synchronized manner, and
a connector connecting the plurality of partitions such that the plurality of partitions integrally rotate around an axis, wherein the power-transmitting case accommodates the plurality of inner ring members, the plurality of rolling elements, the plurality of outer ring members, and the retainer, so as to allow access to the plurality of inner ring members and the retainer from outside, wherein the inner ring has first and second inner ring members disposed in series in order of a first side, which is one side in the axial direction, to a second side, which is opposite to the first side in the axial direction, as the plurality of inner ring members, wherein the outer ring has first and second outer ring members respectively cooperating with the first and second inner ring members as the plurality of outer ring members, wherein the power-transmitting case has a stopper engaged with an end face on the first side in the axial direction of the first outer ring member to prevent movement of the first outer ring member toward the first side in the axial direction, wherein the preloading means presses the second outer ring toward the first side in the axial direction, wherein the second outer ring member, the second inner ring member, the first inner ring member, and the first outer ring member are configured such that a pressing force exerted on the second outer ring member by the preloading means is transmitted to the second inner ring member via the corresponding rolling elements as a force that presses the second inner ring member toward the first side in the axial direction, and the pressing force toward the first side in the axial direction transmitted to the second inner ring member is transmitted to the first outer ring member via the first inner ring member and the corresponding rolling elements as a force that presses the first outer ring member toward the first side in the axial direction, wherein the power-transmitting case has a peripheral wall, a first end wall blocking the first side in the axial direction of the peripheral wall and having an axial hole into which the rotational shaft is inserted, and a second end wall blocking the second side in the axial direction of the peripheral wall and having an access opening for access to the retainer;

the peripheral wall has:
  an engagement surface directly or indirectly engaged with outer circumferential surfaces of the first and second outer ring members so as to allow axial-direction movement of at least the second outer ring member, and terminating at a position more toward the first side in the axial direction than the second end wall is, and
  an attachment surface extending from an end on the second side in the axial direction of the engagement surface in a radially outward direction with reference to an axis of the rotational shaft, and facing the second side in the axial direction; and wherein the preloading means has a screw member inserted into a screw hole open to the attachment surface, and a pressing body directly or indirectly engaged with the second side in the axial direction of the second outer ring member and fixed to the peripheral wall by the screw member.

* * * * *